(12) United States Patent
Berns et al.

(10) Patent No.: US 6,577,395 B1
(45) Date of Patent: Jun. 10, 2003

(54) METHOD FOR MEASURING A LIGHTING CONDITION AND AN APPARATUS THEREOF

(75) Inventors: Roy S. Berns, Pittsford, NY (US); Masayoshi Shimizu, Isehara (JP)

(73) Assignees: Rochester Institute of Technology, Rochester, NY (US); Fujitsu LTD (JP)

( * ) Notice: Subject to any disclaimer, the term of this patent is extended or adjusted under 35 U.S.C. 154(b) by 363 days.

(21) Appl. No.: 09/640,883

(22) Filed: Aug. 18, 2000

Related U.S. Application Data
(60) Provisional application No. 60/149,827, filed on Aug. 19, 1999.

(51) Int. Cl.⁷ .................................................. G01J 3/46
(52) U.S. Cl. ..................... 356/402; 356/405; 356/406
(58) Field of Search .............................. 356/402, 405, 356/406, 421, 422, 423, 424

(56) References Cited

U.S. PATENT DOCUMENTS

| | | | | |
|---|---|---|---|---|
| 3,841,763 A | * | 10/1974 | Lewis | 356/207 |
| 5,033,857 A | * | 7/1991 | Kubota et al. | 356/402 |
| 5,157,464 A | * | 10/1992 | Laihanen | 356/402 |
| 5,416,890 A | | 5/1995 | Beretta | 395/131 |
| 5,638,117 A | * | 6/1997 | Engeldrum et al. | 348/179 |
| 5,799,105 A | | 8/1998 | Tao | 382/167 |
| 5,850,472 A | | 12/1998 | Alston et al. | 382/162 |
| 5,956,015 A | | 9/1999 | Hino | 345/153 |

OTHER PUBLICATIONS

Hung, "Color Reproduction Using Spectral Characterization Advantages and Limitations," *International Symposium on Multispectral Imaging and Color Reproduction for Digital Archives Procedings* pp. 98–105 (Oct. 21, 1999).

Alfvin et al., "Observer Variability in Metameric Color Matches Using Color Reproduction Media," *Color Res. Appl.* 22(3):174–188 (1997).

Wright, "Why and How Chromatic Adaption Has Been Studied," *Color Res. Appl.* 6:147–152 (1981).

Finlayson et al., "Recovering Device Sensitivities with Quadratic Programming," *Sixth Color Imaging Conference* 90–95 (Nov. 17, 1998).

CIE, "Table 3.1 Relative Spectral Power Distribution of Illuminants Repressing Typical Fluorescent Lamps," *Colorimetry Second Edition* pp. 70–71 (1986).

Nayatani et al., "Color–Matching Properties of Fluorescent Lamps with Different Values of the General Color–Rendering Index," *Bul. Electrotech. Lab.* 35:26–46 (1971).

Ohta, "Estimating Absorption Bands of Component Dyes by Means of Principal Components Analysis," *Analytical Chemistry* 45:553–557 (1973).

Cochenille Color Aids [retrieved from the Internet at http://www.cochenille.com/color.htm on Nov. 30, 2000].

(List continued on next page.)

*Primary Examiner*—Michael P. Stafira
*Assistant Examiner*—Roy M. Punnoose
(74) *Attorney, Agent, or Firm*—Nixon Peabody LLP

(57) ABSTRACT

A method, apparatus and computer-readable medium allows users to measure a lighting condition of an object. In one embodiment, at least one user visually compares colored materials against a displayed color sample. Users may adjust the color of the displayed color sample by changing corresponding attribute values until the displayed color sample appears to substantially match the colored material. Once users indicate that they have established a color match between a displayed color sample and a colored material, the spectral irradiance value of the substantially matched color sample is calculated. The spectral irradiance value represents a measurement of the lighting condition in a particular room.

68 Claims, 19 Drawing Sheets

OTHER PUBLICATIONS

Fairchild et al., "Goniospectrophotometric Analysis of Pressed PTFE Powder for Use as a Primary Transfer Standard," *Appl. Opt*. 27:3392–3396 (1988).

Efg's Color Chart Lab Report pp. 1–5 [retrieved from the Internet at http://www.efg2.com/lab/Graphics/Colors/ColorCharts.htm on Nov. 30, 2000].

"PR®–650 SpectraScan® Colorimeter" *Photo Research* (1999).

Specification ICC.1:1988–09, File Format for Color Profiles [retrieved from the Internet at http://www.color.org/profiles.html on Dec. 21, 2000].

Berns, "Billmeyer and Saltzman's Principles of Color Technology,"Third Edition, John Wiley and Sons, pp. 66–70 (2000).

The Math Works—Product Family Overview [retrieved from the internet at http://www.mathworks.com/products/prodoverview.shtml on Nov. 31, 2000 with a copyright date of Mar. 1999].

Hunt, "The Author," *Measuring Colour* Third Edition, Table of Contents, Fountain Press (1998).

Hunt, "2.6 CIE Colour–Matching Functions," *Measuring Colour* Third Edition, Fountain Press pp. 46–50 (1998).

Hunt, "3.3 Chromaticity," *Measuring Colour* Third Edition, Fountain Press pp. 54–57 (1998).

Hunt, "3.8 CIE 1976 lightness, L," *Measuring Colour* Third Edition, Fountain Press pp. 63–65 (1998).

* cited by examiner $$\pi \cdot \begin{vmatrix} X_1 \\ Y_1 \\ Z_1 \\ X_2 \\ Y_2 \\ Z_2 \\ \vdots \\ X_n \\ Y_n \\ Z_n \end{vmatrix} = \begin{vmatrix} \overline{x_1} \cdot r_{11} & \overline{x_2} \cdot r_{12} & \ldots & \overline{x_m} \cdot r_{1m} \\ \overline{y_1} \cdot r_{11} & \overline{y_2} \cdot r_{12} & \ldots & \overline{y_m} \cdot r_{1m} \\ \overline{z_1} \cdot r_{11} & \overline{z_2} \cdot r_{12} & \ldots & \overline{z_m} \cdot r_{1m} \\ \overline{x_1} \cdot r_{21} & \overline{x_2} \cdot r_{22} & \ldots & \overline{x_m} \cdot r_{2m} \\ \overline{y_1} \cdot r_{21} & \overline{y_2} \cdot r_{22} & \ldots & \overline{y_m} \cdot r_{2m} \\ \overline{z_1} \cdot r_{21} & \overline{z_2} \cdot r_{22} & \ldots & \overline{z_m} \cdot r_{2m} \\ & & \vdots & \\ \overline{x_1} \cdot r_{n1} & \overline{x_2} \cdot r_{n2} & \ldots & \overline{x_m} \cdot r_{nm} \\ \overline{y_1} \cdot r_{n1} & \overline{y_2} \cdot r_{n2} & \ldots & \overline{y_m} \cdot r_{nm} \\ \overline{z_1} \cdot r_{n1} & \overline{z_2} \cdot r_{n2} & \ldots & \overline{z_m} \cdot r_{nm} \end{vmatrix} \cdot \begin{vmatrix} e_1 \\ e_2 \\ \vdots \\ e_m \end{vmatrix} \cdot \Lambda\lambda$$

FIG. 10

$$\begin{vmatrix} e_1 \\ e_2 \\ \vdots \\ e_m \end{vmatrix} = \begin{vmatrix} i_{11} & i_{21} & f_{11} & f_{21} & f_{31} & f_{41} & d_{11} & d_{21} & d_{31} \\ i_{12} & i_{22} & f_{12} & f_{22} & f_{32} & f_{42} & d_{12} & d_{22} & d_{32} \\ \vdots & \vdots & \vdots & \vdots & \vdots & \vdots & \vdots & \vdots & \vdots \\ i_{1m} & i_{2m} & f_{1m} & f_{2m} & f_{3m} & f_{4m} & d_{1m} & d_{2m} & d_{3m} \end{vmatrix} \cdot \begin{vmatrix} C_{i1} \\ C_{i2} \\ C_{f1} \\ C_{f2} \\ C_{f3} \\ C_{f4} \\ C_{d1} \\ C_{d2} \\ C_{d3} \end{vmatrix}$$

FIG. 11

$$\vec{\pi} \cdot \begin{vmatrix} X_1 \\ Y_1 \\ Z_1 \\ X_2 \\ Y_2 \\ Z_2 \\ \vdots \\ X_n \\ Y_n \\ Z_n \end{vmatrix} = \begin{vmatrix} x_1 \cdot r_{11} & x_2 \cdot r_{12} & \ldots & x_m \cdot r_{1m} \\ y_1 \cdot r_{11} & y_2 \cdot r_{12} & \ldots & y_m \cdot r_{1m} \\ z_1 \cdot r_{11} & z_2 \cdot r_{12} & \ldots & z_m \cdot r_{1m} \\ x_1 \cdot r_{21} & x_2 \cdot r_{22} & \ldots & x_m \cdot r_{2m} \\ y_1 \cdot r_{21} & y_2 \cdot r_{22} & \ldots & y_m \cdot r_{2m} \\ z_1 \cdot r_{21} & z_2 \cdot r_{22} & \ldots & z_m \cdot r_{2m} \\ & & \ddots & \\ x_1 \cdot r_{n1} & x_2 \cdot r_{n2} & \ldots & x_m \cdot r_{nm} \\ y_1 \cdot r_{n1} & y_2 \cdot r_{n2} & \ldots & y_m \cdot r_{nm} \\ z_1 \cdot r_{n1} & z_2 \cdot r_{n2} & \ldots & z_m \cdot r_{nm} \end{vmatrix} \cdot \begin{vmatrix} i_{11} & i_{21} & f_{11} & f_{21} & f_{31} & f_{41} & d_{11} & d_{21} & d_{31} \\ i_{12} & i_{22} & f_{12} & f_{22} & f_{32} & f_{42} & d_{12} & d_{22} & d_{32} \\ \vdots & \vdots & \vdots & \vdots & \vdots & \vdots & \vdots & \vdots & \vdots \\ i_{1m} & i_{2m} & f_{1m} & f_{2m} & f_{3m} & f_{4m} & d_{1m} & d_{2m} & d_{3m} \end{vmatrix} \cdot \vec{\lambda}$$

$$\begin{vmatrix} C_{i1} & C_{i2} & C_{f1} & C_{f2} & C_{f3} & C_{f4} & C_{d1} & C_{d2} & C_{d3} \end{vmatrix}$$

*FIG. 12*

$$\begin{array}{c|ccccccccc} & c_{i1} & c_{i2} & c_{f1} & c_{f2} & c_{f3} & c_{f4} & c_{d1} & c_{d2} & c_{d3} \\ \hline 0 & i_{11} & i_{21} & f_{11} & f_{21} & f_{31} & f_{41} & d_{11} & d_{21} & d_{31} \\ 0 & i_{12} & i_{22} & f_{12} & f_{22} & f_{32} & f_{42} & d_{12} & d_{22} & d_{32} \\ \vdots & \vdots & \vdots & \vdots & \vdots & \vdots & \vdots & \vdots & \vdots & \vdots \\ 0 & i_{1m} & i_{2m} & f_{1m} & f_{2m} & f_{3m} & f_{4m} & d_{1m} & d_{2m} & d_{3m} \end{array}$$

FIG. 13

$$\begin{vmatrix} r_{11} & r_{21} & \cdots & r_{k1} \\ r_{12} & r_{22} & \cdots & r_{k2} \\ \vdots & \vdots & \cdots & \vdots \\ r_{1m} & r_{2m} & \cdots & r_{km} \end{vmatrix} = \begin{vmatrix} p_{11} & p_{21} & \cdots & p_{k1} \\ p_{12} & p_{22} & \cdots & p_{k2} \\ \vdots & \vdots & \cdots & \vdots \\ p_{1m} & p_{2m} & \cdots & p_{km} \end{vmatrix} \cdot \begin{vmatrix} 1 & 1 & 1 & \cdots & 1 \\ c_{12} & c_{22} & c_{k2} & \cdots & c_{k2} \\ \vdots & \vdots & \vdots & \cdots & \vdots \\ c_{1k} & c_{2k} & c_{kk} & \cdots & c_{kk} \end{vmatrix}$$

FIG. 14

$$\min\left(\text{pinv}\left(\begin{bmatrix} r_{11} & r_{21} & \ldots & r_{n1} \\ r_{12} & r_{22} & \ldots & r_{n2} \\ \vdots & \vdots & \vdots & \vdots \\ r_{1m} & r_{2m} & \ldots & r_{nm} \end{bmatrix}\right) \cdot \begin{bmatrix} P_{11} & P_{21} & \ldots & P_{N1} \\ P_{12} & P_{22} & \ldots & P_{N2} \\ \vdots & \vdots & \vdots & \vdots \\ P_{1m} & P_{2m} & \ldots & P_{Nm} \end{bmatrix}\right)$$

FIG. 15

$$0 \le \min\left(\begin{bmatrix} r_{11} & r_{21} & \ldots & r_{n1} \\ r_{12} & r_{22} & \ldots & r_{n2} \\ \vdots & \vdots & \vdots & \vdots \\ r_{1m} & r_{2m} & \ldots & r_{nm} \end{bmatrix}\right)$$

FIG. 16

$$\begin{vmatrix} c_{11} & c_{21} & \ldots & c_{N1} \\ c_{12} & c_{22} & \ldots & c_{N2} \end{vmatrix} = \text{pinv}\left(\begin{bmatrix} P_{11} & P_{21} & \ldots & P_{N1} \\ P_{12} & P_{22} & \ldots & P_{N2} \\ \vdots & \vdots & \vdots & \vdots \\ P_{1m} & P_{2m} & \ldots & P_{Nm} \end{bmatrix}\right) \cdot \begin{vmatrix} p_{11} & p_{21} \\ p_{12} & p_{22} \\ \vdots & \vdots \\ p_{1m} & p_{2m} \end{vmatrix}$$

FIG. 17

$C_{12} = \text{maxforeach}(c_{i2}/c_{i2})$  $(1 \le i \le N)$
$C_{22} = \text{minforeach}(c_{i2}/c_{i2})$  $(1 \le i \le N)$

FIG. 18

$$\begin{vmatrix} 0 \\ 0 \\ 0 \\ 0 \\ 0 \\ 0 \\ 0 \\ 0 \\ 0 \end{vmatrix} \le \begin{vmatrix} C_{i1} \\ C_{i2} \\ C_{f1} \\ C_{f2} \\ C_{f3} \\ C_{f4} \\ C_{d1} \\ C_{d2} \\ C_{d3} \end{vmatrix}$$

$$\begin{vmatrix} 0 \\ 0 \\ 0 \\ 0 \\ 0 \\ 0 \\ 0 \\ 0 \\ 0 \\ 0 \end{vmatrix} \leq \begin{vmatrix} C_{rdl1} \\ C_{rdl2} \\ C_{rdh1} \\ C_{rdh2} \\ C_{rfs1} \\ C_{rfs2} \\ C_{rfh1} \\ C_{rfh2} \\ C_{rft1} \\ C_{rft2} \end{vmatrix}$$

FIG. 21

$$\begin{vmatrix} e_1 \\ e_2 \\ \vdots \\ e_m \end{vmatrix} = \begin{vmatrix} r_{dl11} & r_{dl21} & r_{dh11} & r_{dh21} & r_{fs11} & r_{fs21} & r_{fh11} & r_{fh21} & r_{ft11} & r_{ft21} \\ r_{dl12} & r_{dl22} & r_{dh12} & r_{dh22} & r_{fs12} & r_{fs22} & r_{fh12} & r_{fh22} & r_{ft12} & r_{ft22} \\ \vdots & \vdots & \vdots & \vdots & \vdots & \vdots & \vdots & \vdots & \vdots & \vdots \\ r_{dl1m} & r_{dl2m} & r_{dh1m} & r_{dh2m} & r_{fs1m} & r_{fs2m} & r_{fh1m} & r_{fh2m} & r_{ft1m} & r_{ft2m} \end{vmatrix} \cdot \begin{vmatrix} C_{rdl1} \\ C_{rdl2} \\ C_{rdh1} \\ C_{rdh2} \\ C_{rfs1} \\ C_{rfs2} \\ C_{rfh1} \\ C_{rfh2} \\ C_{rft1} \\ C_{rft2} \end{vmatrix}$$

$$\pi \cdot \begin{bmatrix} X_1 \\ Y_1 \\ Z_1 \\ X_2 \\ Y_2 \\ Z_2 \\ \vdots \\ X_4 \\ Y_4 \\ Z_4 \end{bmatrix} = \begin{bmatrix} \overline{x_1} \cdot r_{11} & \overline{x_2} \cdot r_{12} & \ldots & \overline{x_m} \cdot r_{1m} \\ \overline{y_1} \cdot r_{11} & \overline{y_2} \cdot r_{12} & \ldots & \overline{y_m} \cdot r_{1m} \\ \overline{z_1} \cdot r_{11} & \overline{z_2} \cdot r_{12} & \ldots & \overline{z_m} \cdot r_{1m} \\ \overline{x_1} \cdot r_{21} & \overline{x_2} \cdot r_{22} & \ldots & \overline{x_m} \cdot r_{2m} \\ \overline{y_1} \cdot r_{21} & \overline{y_2} \cdot r_{22} & \ldots & \overline{y_m} \cdot r_{2m} \\ \overline{z_1} \cdot r_{21} & \overline{z_2} \cdot r_{22} & \ldots & \overline{z_m} \cdot r_{2m} \\ & & \vdots & \\ \overline{x_1} \cdot r_{41} & \overline{x_2} \cdot r_{42} & \ldots & \overline{x_m} \cdot r_{4m} \\ \overline{y_1} \cdot r_{41} & \overline{y_2} \cdot r_{42} & \ldots & \overline{y_m} \cdot r_{4m} \\ \overline{z_1} \cdot r_{41} & \overline{z_2} \cdot r_{42} & \ldots & \overline{z_m} \cdot r_{4m} \end{bmatrix} \cdot \begin{bmatrix} r_{dl11} & r_{dl21} & r_{fs11} & r_{fs21} & r_{fh11} & r_{fh21} & r_{ft11} & r_{ft21} \\ r_{dl12} & r_{dl22} & r_{fs12} & r_{fs22} & r_{fh12} & r_{fh22} & r_{ft12} & r_{ft22} \\ \vdots & & & & & & & \vdots \\ r_{dl1m} & r_{dl2m} & r_{fs1m} & r_{fs2m} & r_{fh1m} & r_{fh2m} & r_{ft1m} & r_{ft2m} \end{bmatrix} \cdot \begin{bmatrix} C_{rdl1} \\ C_{rdl2} \\ C_{rfs1} \\ C_{rfs2} \\ C_{rfh1} \\ C_{rfh2} \\ C_{rft1} \\ C_{rft2} \end{bmatrix} \cdot \lambda v$$

FIG. 24

| $C_{rdl1}$ | $C_{rdl2}$ | $C_{rfs1}$ | $C_{rfs2}$ | $C_{rfh1}$ | $C_{rfh2}$ | $C_{rft1}$ | $C_{rft2}$ |
|---|---|---|---|---|---|---|---|
| | | | VI | | | | |
| 0 | 0 | 0 | 0 | 0 | 0 | 0 | 0 |

$$\pi \cdot \begin{vmatrix} X_1 \\ Y_1 \\ Z_1 \\ X_2 \\ Y_2 \\ Z_2 \\ \vdots \\ X_4 \\ Y_4 \\ Z_4 \end{vmatrix} = \begin{vmatrix} x_1 \cdot r_{11} & x_2 \cdot r_{12} & \dots & x_m \cdot r_{1m} \\ y_1 \cdot r_{11} & y_2 \cdot r_{12} & \dots & y_m \cdot r_{1m} \\ z_1 \cdot r_{11} & z_2 \cdot r_{12} & \dots & z_m \cdot r_{1m} \\ x_1 \cdot r_{21} & x_2 \cdot r_{22} & \dots & x_m \cdot r_{2m} \\ y_1 \cdot r_{21} & y_2 \cdot r_{22} & \dots & y_m \cdot r_{2m} \\ z_1 \cdot r_{21} & z_2 \cdot r_{22} & \dots & z_m \cdot r_{2m} \\ & & \vdots & \\ x_1 \cdot r_{41} & x_2 \cdot r_{42} & \dots & x_m \cdot r_{4m} \\ y_1 \cdot r_{41} & y_2 \cdot r_{42} & \dots & y_m \cdot r_{4m} \\ z_1 \cdot r_{41} & z_2 \cdot r_{42} & \dots & z_m \cdot r_{4m} \end{vmatrix}$$

$$\lambda \cdot \begin{vmatrix} Crdh1 \\ Crdh2 \\ Crfs1 \\ Crfs2 \\ Crfh1 \\ Crfh2 \\ Crft1 \\ Crft2 \end{vmatrix} = \begin{vmatrix} r_{dh11} & r_{dh21} & r_{fs11} & r_{fs21} & r_{fh11} & r_{fh21} & r_{ft11} & r_{ft21} \\ r_{dh12} & r_{dh22} & r_{fs12} & r_{fs22} & r_{fh12} & r_{fh22} & r_{ft12} & r_{ft22} \\ \vdots & \vdots & \vdots & \vdots & \vdots & \vdots & \vdots & \vdots \\ r_{dh1m} & r_{dh2m} & r_{fs1m} & r_{fs2m} & r_{fh1m} & r_{fh2m} & r_{ft1m} & r_{ft2m} \end{vmatrix}$$

FIG. 25

$$vi \cdot \begin{vmatrix} Crdh1 \\ Crdh2 \\ Crfs1 \\ Crfs2 \\ Crfh1 \\ Crfh2 \\ Crft1 \\ Crft2 \end{vmatrix} = \begin{vmatrix} 0 \\ 0 \\ 0 \\ 0 \\ 0 \\ 0 \\ 0 \\ 0 \end{vmatrix}$$

FIG. 26

$$\begin{vmatrix} e_1 \\ e_2 \\ \vdots \\ e_m \end{vmatrix} = \begin{vmatrix} r_{dl11} & r_{dl21} & r_{fs11} & r_{fs21} & r_{fh11} & r_{fh21} & r_{ft11} & r_{ft21} \\ r_{dl12} & r_{dl22} & r_{fs12} & r_{fs22} & r_{fh12} & r_{fh22} & r_{ft12} & r_{ft22} \\ \vdots & \vdots & \vdots & \vdots & \vdots & \vdots & \vdots & \vdots \\ r_{dl1m} & r_{dl2m} & r_{fs1m} & r_{fs2m} & r_{fh1m} & r_{fh2m} & r_{ft1m} & r_{ft2m} \end{vmatrix} \bullet \begin{vmatrix} C_{rdl1} \\ C_{rdl2} \\ C_{rfs1} \\ C_{rfs2} \\ C_{rfh1} \\ C_{rfh2} \\ C_{rft1} \\ C_{rft2} \end{vmatrix}$$

FIG. 27

$$\begin{vmatrix} e_1 \\ e_2 \\ \vdots \\ e_m \end{vmatrix} = \begin{vmatrix} r_{dh11} & r_{dh21} & r_{fs11} & r_{fs21} & r_{fh11} & r_{fh21} & r_{ft11} & r_{ft21} \\ r_{dh12} & r_{dh22} & r_{fs12} & r_{fs22} & r_{fh12} & r_{fh22} & r_{ft12} & r_{ft22} \\ \vdots & \vdots & \vdots & \vdots & \vdots & \vdots & \vdots & \vdots \\ r_{dh1m} & r_{dh2m} & r_{fs1m} & r_{fs2m} & r_{fh1m} & r_{fh2m} & r_{ft1m} & r_{ft2m} \end{vmatrix} \bullet \begin{vmatrix} C_{rdh1} \\ C_{rdh2} \\ C_{rfs1} \\ C_{rfs2} \\ C_{rfh1} \\ C_{rfh2} \\ C_{rft1} \\ C_{rft2} \end{vmatrix}$$

FIG. 28

$C^*_{Vi} = (a^*_{Pi}{}^2 + b^*_{Pi}{}^2)^{1/2}$, $C^*_{Di} = (a^*_{Di}{}^2 + b^*_{Di}{}^2)^{1/2}$, $\Delta L^*_i = L^*_{Pi} - L^*_{Di}$, $\Delta C_{94}^*_i = (C^*_{Pi} - C^*_{Di})/(1 + 0.045 \cdot C^*_{Di})$, $\Delta H_{94}^*_i = ((a^*_{Pi} - a^*_{Di})^2 + (b^*_{Pi} - b^*_{Di})^2 - (C^*_{Pi} - C^*_{Di})^2)/(1 + 0.015 \cdot C^*_{Di})$, if $a^*_{Di} \cdot (b^*_{Pi} - b^*_{Di}) > b^*_{Di} \cdot (a^*_{Pi} - a^*_{Di})$ then $\Delta H_{94}^*_i = -\Delta H_{94}^*_i$.

FIG. 43

$$\text{Mean\_S}_{E94}\_A = \frac{1}{24} \sum_{i=1}^{24} S_{E94.i.A}. \qquad \text{Mean\_S}_{E94}\_D65 = \frac{1}{24} \sum_{i=1}^{24} S_{E94.i.D65}.$$

$$\text{Mean\_S}_{E94}\_F2 = \frac{1}{24} \sum_{i=1}^{24} S_{E94.i.F2}. \qquad \text{Mean\_S}_{E94}\_F7 = \frac{1}{24} \sum_{i=1}^{24} S_{E94.i.F7}.$$

$$\text{Mean\_S}_{E94}\_F11 = \frac{1}{24} \sum_{i=1}^{24} S_{E94.i.F11}.$$

FIG. 44

METHOD FOR MEASURING A LIGHTING CONDITION AND AN APPARATUS THEREOF

This application claims the benefit of U.S. Provisional Application Serial No. 60/149,827 filed on Aug. 19, 1999, which is herein incorporated by reference.

FIELD OF THE INVENTION

This invention relates to a method and apparatus for measuring a lighting condition of an object having one or more colors.

BACKGROUND OF THE INVENTION

Colors reflected from objects (e.g., printed materials, images displayed on a computer monitor, etc.) are perceived differently by human observers under varying lighting conditions. For example, a blue sheet of paper may appear to emit a greenish tinge in a room having a fluorescent light source while the same blue sheet of paper may appear to emit a yellowish tinge in another room equipped with incandescent lighting.

Conventional color management systems, such as systems based upon the ICC Profile Format, are widely used in the graphic arts and image processing fields. These conventional systems usually control tristimulus values to effect equivalent color reproduction. For example, to reproduce a printed image with colors equivalent to the original under different lighting conditions, a chromatic adaptation transform is applied to compensate for white point differences, and a color signal transform is applied to transform the tristimulus values into the specific color signals for an output device. However, this conventional method is deficient and often fails to yield accurate results, largely due to the fact that spectral information is ignored.

Accordingly, to predict an object's true color where lighting conditions in a particular room alter the object's color, the object's light reflective properties must be reconciled with the lighting conditions. In particular, to predict the true color of an object having spectrally non-selective reflectance factors, information is needed regarding the lighting conditions in the object's particular location. In this case, tristimulus values of light reflected from the object can be calculated from the illuminance and chromaticity coordinates of light irradiated onto the object using conventional mathematical normalization techniques. Similarly, to predict the true color of an object having spectrally selective reflectance factors, information is needed regarding the lighting conditions in the object's particular location (i.e., spectral irradiance). Tristimulus values of light reflected from an object can be calculated from linear combinations of color matching functions, the object's spectral reflectance factor, and the spectral irradiance.

Predicting the actual colors of objects is desirable for a number of reasons. For example, an image processing device in different lighting conditions could use such information to process images to compensate for any potential color distortions caused by the lighting conditions. By modifying the images in this manner, images could be displayed on a computer display device emitting their actual colors, as if undisturbed by spectral irradiance. Another example includes using such information to alter data representing materials to be printed out to account for possible effects of spectral irradiance upon the printed material.

Unfortunately, heretofore highly specialized and expensive instruments have been necessary for measuring lighting conditions, including spectral irradiance and illuminance and chromaticity coordinates, within an acceptable degree of accuracy. The expense of these instruments has made them prohibitive for many applications. Additionally, a high degree of technical prowess, advanced mathematical skills and/or training are required to operate such conventional lighting condition measurement equipment.

Accordingly, a need exists for a method and apparatus that could be used for measuring lighting conditions without requiring the utilization of any highly specialized, expensive instruments or requiring a great deal of technical prowess, advanced mathematical skills and/or training. Moreover, it would be advantageous if such a method and apparatus could be easily installed, configured, used and maintained.

SUMMARY OF THE INVENTION

A method for measuring a lighting condition of an object having one or more colors in accordance with one embodiment of the present invention includes a few steps. In this method, one or more samples are provided with each of the samples having one or more colors. One of the colors of the object is compared against one of the colors of one of the samples. The color of the sample being compared is defined by a plurality of color attribute values. At least one of the plurality of color attribute values representing the color of the sample being compared is adjusted until the color of the sample appears to substantially match the color of the object. Once the color attribute values are adjusted, the lighting condition of the object is determined based on the adjusted plurality of color attribute values.

An apparatus for measuring a lighting condition of an object having one or more colors in accordance with another embodiment of the present invention includes a display device, a color attribute interface, and a processing system. The display device displays one or more samples for comparing one of the colors of the object against one of one or more colors of one the samples. The color attribute interface is used to adjust at least one of a plurality of color attribute values representing the color of the sample until the color of the sample appears to substantially match the color of the object. The processing system determines the lighting condition of the object based on the adjusted plurality of color attribute values.

A program storage device readable by a machine tangibly embodying a program of instructions executable by the machine to perform a method for determining a lighting condition of an object having one or more colors includes providing one or more samples, each of the samples having one or more colors; comparing one of the colors of the object against one of the colors of one of the samples, the color of the sample being compared defined by a plurality of color attribute; adjusting at least one of the plurality of color attribute values representing the color of the sample being compared until the color of the sample appears to substantially match the color of the object; and determining the lighting condition of the object based on the adjusted plurality of color attribute values.

One of the advantages of the present invention is that the lighting condition in a room may be measured without requiring the utilization of any highly specialized, expensive instruments or requiring a great deal of technical prowess, advanced mathematical skills and/or training. Moreover, the lighting condition measurements taken in accordance with the present invention are accurate to an acceptable degree and do not require a great deal of effort or time on the part of the user. Further, the present invention is easily installed, configured, used and maintained.

BRIEF DESCRIPTION OF THE DRAWINGS

FIGS. 10–28 show various equations applied in solving for the relationship between the color matching functions, spectral irradiance, spectral reflectance factors, and constraints;

FIG. 43 shows the $S_{E94}$ index indicating deviations of CIELab values among different observers; and FIG. 44 shows the mean value of the $S_{E94}$ index over twenty-four colors.

DETAILED DESCRIPTION OF THE INVENTION

Figure 1:
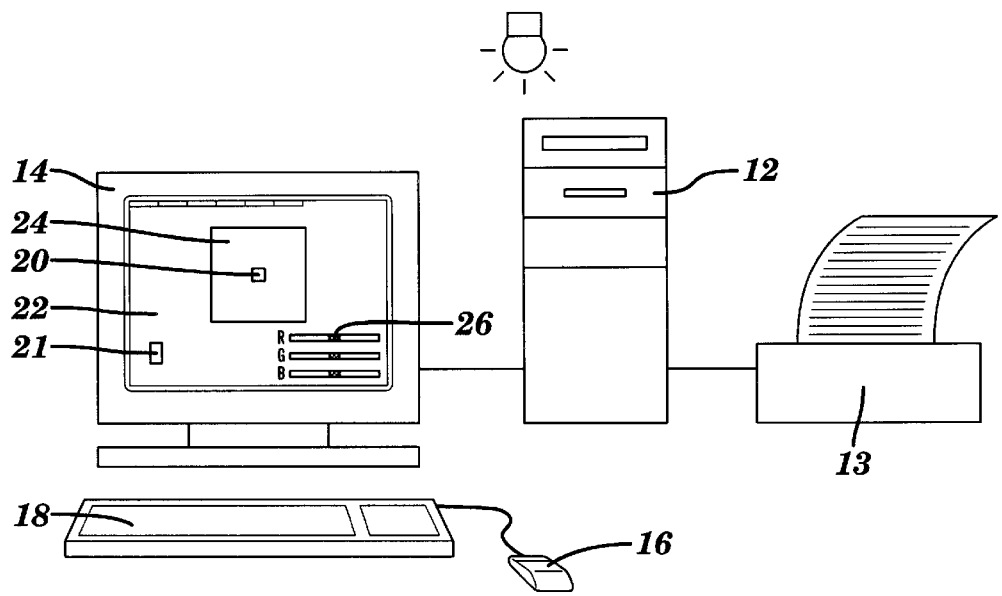
FIG. 1 is a diagram of lighting condition measurement apparatus in accordance with one embodiment of the present invention.
Figure 2:
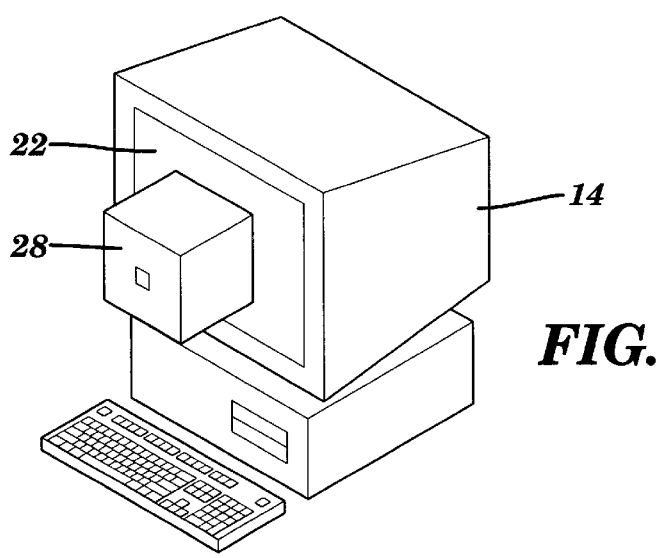
FIG. 2 is a perspective view of a lighting condition measurement apparatus in accordance with another embodiment of the present invention.
Figure 9:
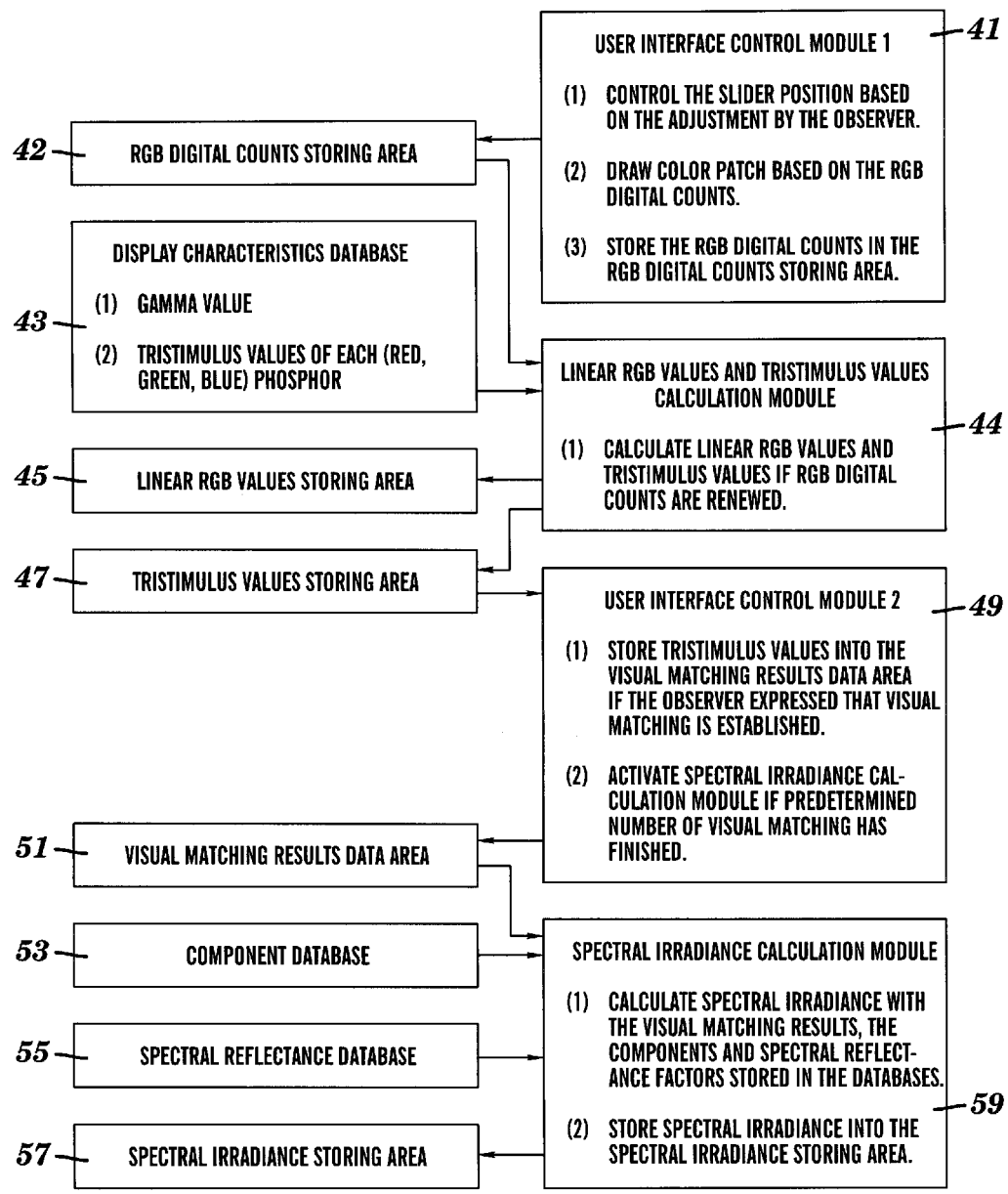
FIG. 9 is a flow chart of a process for measuring a lighting condition in accordance with another embodiment of the present invention.

An apparatus and method for measuring a lighting condition of an object having one or more colors in accordance with one embodiment of the present invention illustrated in FIGS. 1, 2, and 9. The method includes the steps of: comparing one of the colors of the object against one of the colors of one of the samples; adjusting at least one of the plurality of color attribute values representing the color of the sample until the color of the sample appears to substantially match the color of the object; and then determining the lighting condition of the object based on the adjusted plurality of color attribute values. The apparatus includes a display device, a color attribute interface which is used to adjust a plurality of color attribute values representing a sample, and a processing system which determines the lighting condition based on the adjusted plurality of color attribute values. The present invention provides a number of advantages including providing measurements of lighting conditions without the need for any highly specialized, expensive instruments or any technical prowess, advanced mathematical skills and/or training and with an acceptable degree of accuracy.

Referring to FIGS. 1–6, a lighting condition apparatus 10 in accordance with one embodiment of the present invention is illustrated. The apparatus 10 allows a user to measure the lighting condition in a room. In this particular embodiment, the lighting condition apparatus 10 includes a computer processing device 12 operatively coupled to a display device 14. Typically, the computer processing device 12 comprises a central processing unit (not shown) coupled to one or more memory devices (not shown) and one or more input and/or output interfaces. In this particular embodiment, the method in accordance with the present invention and described herein is programmed in and stored as instructions in one or more memory devices in the processing system 12 or in a computer readable medium. By way of example only, the computer processing device 12 may comprise a LIFEBOOK E350, manufactured by the Fujitsu Corp., although a number of different types of processing units, such as a main frame computer, mini computer, micro computer, desktop computer, laptop computer, palmtop computer, etc. also could be used.

As noted above, display device 14 is coupled to computer processing device 12. A variety of different types of display devices 14 may be used, such as a computer monitor or a CRT. The display device 14 may also be operatively coupled to a dumb terminal (not shown) that in turn is operatively coupled to a server/network (not shown) in which the instructions for the method in accordance with the present invention are programmed. A growing number of computer display device manufacturers are shipping to their distributors computer display devices having device profiles pre-loaded thereon, such as a profile based upon the ICC Profile Format, for example, incorporated by reference herein. Accordingly, in this particular embodiment display device 14 is a characterized display having the ICC Profile Format or another standardized profile loaded thereon, although again other types of display devices 14 could be used.

In this particular embodiment, display device 14 includes a display screen 22, although other types of user interfaces can be used. One or more samples 20, such as a color patch 20, can be displayed on the display screen 22. In this particular embodiment, the samples 20 and their characteristics are stored in a database in one or memory devices in computer processing device 12, although this data can be stored elsewhere, such as on a computer disk or can be entered in by the user. An object 24 may also be displayed or temporarily fastened on to the display screen 22. If the object 24 is fastened on to the display screen 22, a variety of different fastening devices can be used, such as clips, tape or an adhesive. Additionally, in this particular embodiment, the characteristics of the object and its color or colors, including reflectance properties or factors, are stored in a database in one or more memory devices, although this data can be stored elsewhere, such as on a computer disk or can be entered in by the user.

In this particular embodiment, a graphical slider 26, is displayed on display screen 22. Although other types of user interfaces could be used which are located elsewhere. In this example, graphical slider 26 comprises three separate sliders 26(1), 26(2), and 26(3), one slider per R, G, or B digital count value, although other numbers and types of sliders can be used. Each of the sliders 26(1)–26(3) in the graphical slider 26 can be manipulated by a user to adjust the color or colors of the sample 20 being shown on display screen 22.

Each R, G, or B digital count value may range from 0 through 255 although other count values and representations of the components of the color being displayed can also be used. Although in the particular embodiment, R, G, and B values are used, other values and component systems for representing the color may be used. For example, L, C, and H which represent lightness, chroma, and hue, can also be used in this particular example, the R, G, and B sliders 26(1)–26(3) would be replaced by L, C, and H sliders. L, C, and H values have a close relation to human color perception. Conversion between R, G, and B values and L, C, and H values are easily performed by XYZ values and L*a*b* values. Conversion between XYZ and L*a*b* can be performed easily as shown in the equations on page 14 of this application. Conversion between XYZ and L*a*b* is well know to those of ordinary skill in the art and is described in R. S. Berns' "Billmeyer and Saltzman's Principles of Color Technology," $3^{rd}$ Edition, John Wiley and Sons, 2000, which is herein incorporated by reference. Conversion between L*a*b* and L, C, H can be performed by the following equations:

$$L = L*$$

$$C = \mathrm{sqrt}(a*\hat{0}2 + b*\hat{0}2)$$

$$H = \mathrm{a\ tan\ 2}(b*, a*)$$

Sqrt(x) returns square root of x. A tan 2(y, x) returns angle between (a*, b*) and (1, 0) on the x-y coordinates. x$\hat{0}$2 denotes square of x.

In this particular embodiment, the lighting condition apparatus 10 also includes a pointer device 16 and a keyboard 18 for allowing information to be entered when desired by the user or prompted by lighting condition apparatus 10, although other types and numbers of user interface devices could be used to enter information. The pointer device 16 may include a mouse, light pen, wand or any other type of device well known in the art for allowing users to effectively input information into a Graphical User Interface (GUI) environment. Further, the keyboard 18 may include ergonomically designed keyboards, infrared (i.e., remote) keyboards or any other type of keyboard as contemplated by one of ordinary skill in the art.

In particular embodiment, display screen 22 also includes a match button 21 that allows a user to indicate when a color match has been established between object 24 and sample 20, although other devices for entering information, such as signaling a color match, to apparatus 10 could be used.

Figure 4:
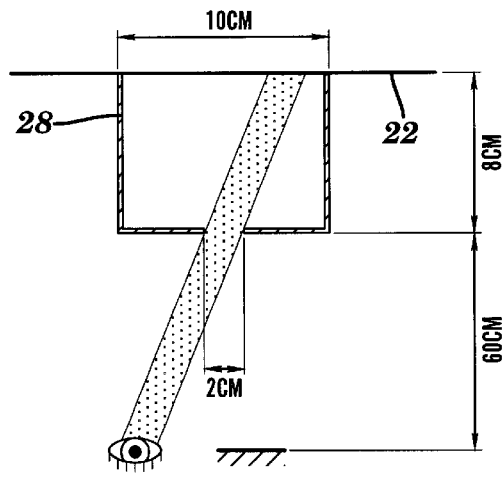
FIG. 4 is a cross-sectional diagram of a partial cover and a display for the apparatus shown in FIG. 2.
Figure 5:
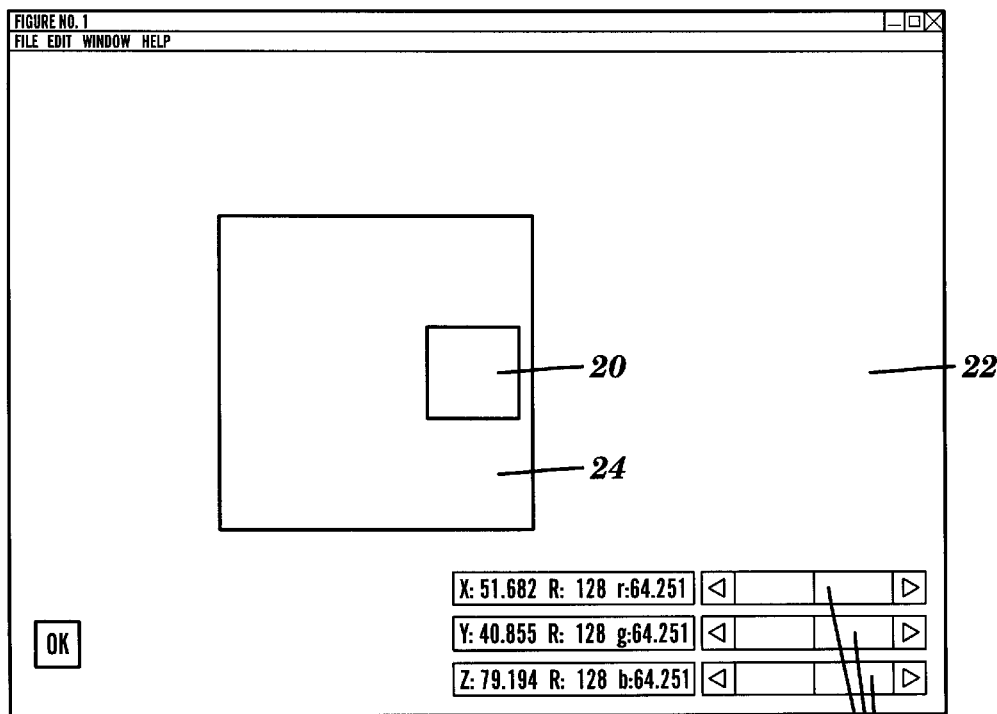
FIG. 5 is a diagram of a display showing the displayed tristimulus values of a color sample.

Referring to FIGS. 2, 4, and 5, lighting condition apparatus 10 may also include a cover 28, such as a box, which is positioned in front of and/or attached to display screen 22 for reducing the amount of irradiation onto at least a portion of display screen 22. In this particular embodiment, cover 28 has an opening at an end opposite from the display screen 22 which corresponds substantially to the size and shape of sample 20, although the cover can have other configurations and other shapes and sizes. Cover 28 may be attached to display device 14 with clips, tape, adhesives, hook and loop type fasteners or any other suitable fastening technique or device. Further, the interior of cover 28 may be covered with an opaque (e.g., black) paper to reduce internal light reflection.

Figure 3:
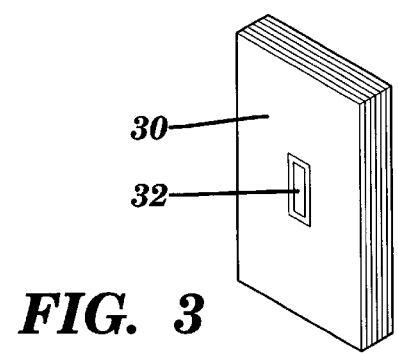
FIG. 3 is a perspective view of colored paper used as a reflecting object.

Referring to FIG. 3, one example of colored paper 30 used for object 24 as contemplated by one embodiment of the present invention is illustrated, although other types of materials and things can be used for object 24. Each sheet of colored paper 30 includes cutout section 32 for allowing a user to view sample 20 once attached to display screen 22. The size and shape of cutout section 32 corresponds to the dimensions of sample 20. In this example, colored paper 30 comprises a 5×3-inch sheet of colored paper (e.g., Color Aid, manufactured by Cochenille Design Studio, Inc.), although other types and shapes of materials could be used.

Figure 7:
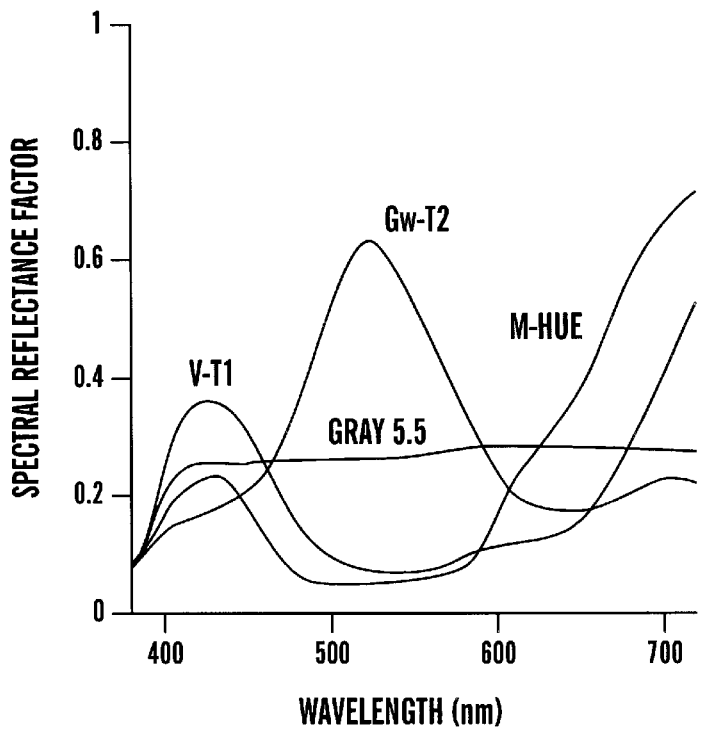
FIG. 7 is a graph illustrating the spectral irradiance factors of four selected sheets of colored paper in accordance with one embodiment of the present invention.

Referring to FIG. 7, spectral reflectance factors of selected sheets of colored paper 30 along with their respective names according to the Color Aid notation and which are herein incorporated by reference are shown.

Figure 8:
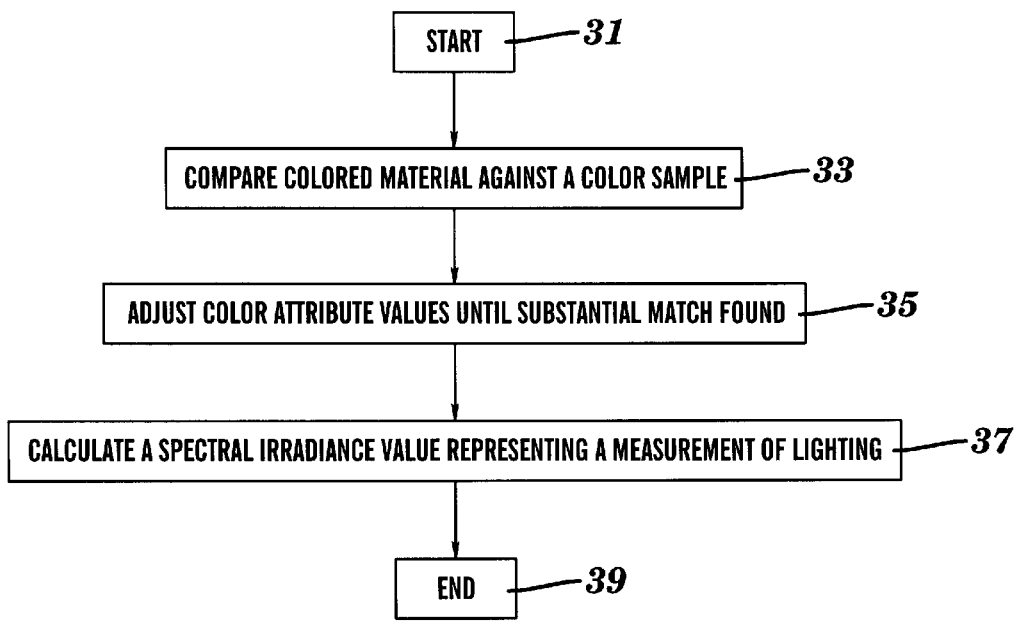
FIG. 8 is a flow chart of a method for measuring a lighting condition in accordance with another embodiment of the present invention.

Referring to FIGS. 1 and 8, the basic operation of the present invention will be discussed. First, a user starts the method for measuring a lighting condition in step 31. Next, in step 33 the user compares a color or an object 24 against a color of a sample 20 on display screen 22. More, specifically, in step 35 the user adjusts a graphical slider 26 in this example, to change the color attribute values (i.e., R, G, or B digital count values) representing sample 20 until the color of sample 20 appears to substantially match the color of object 24. Once a color match has been substantially established, the user uses a pointer device 16 or other user interface device to activate match button 21 in this example. When computer processing unit 12 detects that the user has activated match button 21, in step 37 a lighting condition value or signal representing the substantially matched color sample is determined based on the color attribute values and a reflectance property of the object 24 and possibly a color matching function.

Figure 6:
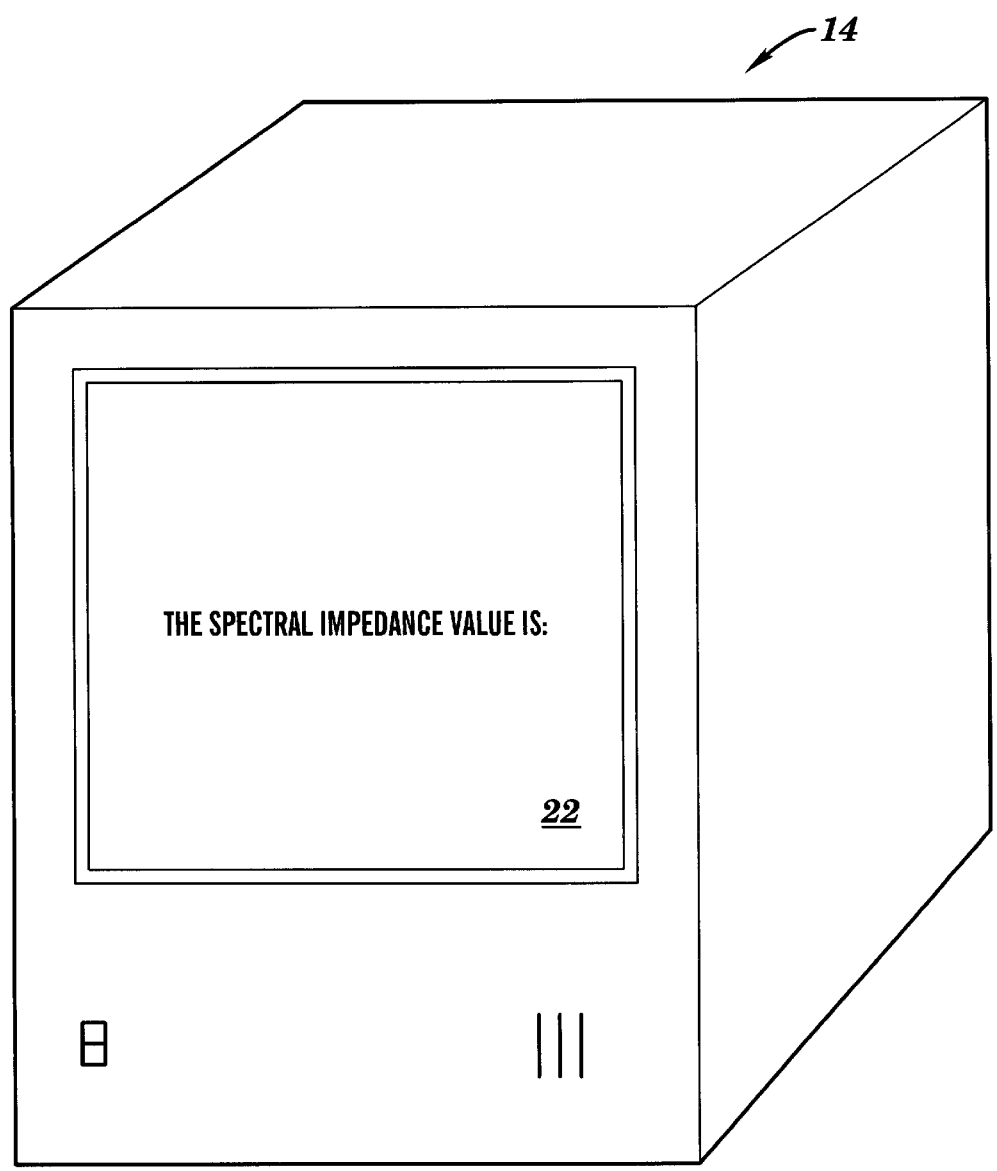
FIG. 6 is a perspective view of a device displaying a plurality of determined spectral irradiance outputs.

The lighting condition output or signal represents a measurement of the lighting condition of the object 24. The lighting condition output can be stored in memory within computer processing device 12 or in another suitable storage device, such as a disk, or the output can simply be displayed, for example, on display screen 22, over a range of wavelengths, such as from about 380 nm to about 720 nm as shown in FIG. 6. The lighting condition output can also be used in other manners, such as to adjust images that are displayed on display screen 22 to reduce the potential effects of lighting conditions upon the displayed images or to modify images before being printed by printer device 13 to reduce the potential effects of the lighting conditions upon printed material.

Referring to FIGS. 1 and 9, a more detailed discussion of the operation of the present invention in accordance with one embodiment will be discussed. In step 31, the present invention is started and a sample 20 is shown on display screen 22. Additionally an object 24 is placed on the display screen 22. In this particular embodiment, the object is a sheet of colored paper 30, although other types of objects 24 with one or more colors on each object 24 can be used. In this particular example, a color of the sample 20 is only compared against one color of the object 24, although multiple colors of the sample 20 can each be compared against a corresponding color on the object 24 or on other objects 24.

In this particular embodiment, the user uses graphical sliders 26(1)–26(3) to change the color of color sample 20 until it visually appears to match the color of reflecting object 24, as perceived by the user. Moving one or more of the sliders 26(1)–26(3) adjusts one or more of the R, G, or B digital count values for the color of the sample and changes the color of the sample. Once a color match is established the R, G, or B digital count values may be stored in a memory in computer processing device 12 or elsewhere, such as in a R, G, and B digital counts storing area as set forth in step 42.

To avoid irradiation of undesired light onto display screen 22 during this comparison, and to help fix the position of the user's eye a partial cover 28, as shown in FIGS. 2 and 4, may be used.

Although in this example, one sheet of colored paper 30 was used for object 24, the present invention has found that four different colors of paper 30 are preferred. Increasing the number of pieces of color paper 30 or other colors on object or objects 24 increases the accuracy of the results in measuring lighting condition(s), but the user's tasks increase in proportion to the number of comparisons. To identify the preferred number and colors to measure lighting condition (s) an experiment was conducted. Eighteen sheets of colored paper were selected from 314 sheets of colored paper from Color Aid based on the limitation of a CRT display color gamut. Then, for all possible combinations of the colored paper selected, the accuracy of measurements was examined by running a simulation and the best combinations were determined. A combination of four sheets of colored paper and a combination of six sheets of colored paper were selected. Both combinations included one sheet of achromatic paper because one task uses the achromatic paper for white point acquisition to set the control of L, C, H sliders. More specifically, the experiment was conducted as follows:

(a) Step One: Selection of Colored Paper Inside CRT Color Gamut

Light reflecting off each sheet of colored paper 30 must be inside the CRT color gamut because each observer establishes a visual color match against the color of the CRT display 14. To determine the gamut of the CRT display, a low CCT light source and a high CCT light source were used to set the illumination a little brighter than that in an ordinary office environment.

Sheets of colored paper 30 inside of the CRT display 14 gamut under both illumination settings, a sheet of achromatic paper with the lightest color, and the most chromatic paper from each hue according to the Color Aid notation were selected. For some hue angles, all of the colored paper are out-of-gamut. As a result, seventeen sheets of chromatic paper and one sheet of achromatic paper were selected. The settings for the display are set forth below:

White point: 100 cd/m², D65
Phosphor: R(x, y)=(0.637, 0.343), G(x, y)=(0.298, 0.626), B(x, y)=(0.231, 0.103)
Illumination:
A-illuminant, 500 lux 10,000 K CIE daylight, 500 lux (b) Step Two: Selection of Colored Paper Combination that Enables High Accuracy Measurement The performance of all of the colored paper combinations using the eighteen sheets selected were examined in a computer simulation.

For each sheet of colored paper 30, the tristimulus values obtained by visual color matching tasks by fifty different observers were simulated for each illuminant by adding fifty error values to the correct tristimulus values. The fifty error values distribute trivariate normally in the CIELab space, and the standard deviation is 3.11 for each component in this particular example. This standard deviation is based on Alfvin's work, which reports on visual color matching errors between a CRT display and colored paper under a daylight simulator, as discussed in "Observer variability in metameric color matches using color reproduction media," Color Res. Appl., 22, 174–188, 1997, herein incorporated by reference. Although the covariance matrix differs for different colors, any patterns across different colors could not be found, so the mean value of the standard deviation reported in the work was used.

With these tristimulus values including the errors, the spectral irradiance obtained by the proposed method in accordance with the present invention was simulated for each combination of colored paper. Results from fifty observers for five illuminants were simulated for each color combination.

The performance of each color paper combination was evaluated based on the $S_{E94}$ index calculated by FIG. 43, which indicates deviations of CIELab values among different observers if spectral irradiance is obtained by the present invention. Actually, the mean value Of $S_{E94}$ over 24 colors for each illuminant is calculated as expressed in FIG. 44 where, subscript i indicates the number of colors in the Macbeth color checker. Each mean value is regarded as the performance under each illuminant. Each colored paper combination using the maximum value among the five mean values from FIG. 44 was elevated. In other words, a color combination that minimizes the worst value among the five values from FIG. 44 was selected.

Optimal results were found when four uniquely colored pieces of colored paper 30 having a spectral reflectance property of gray, magenta, violet or green are used in accordance with one embodiment of the present invention. However, it should be understood that as few as one piece of colored paper 30 or greater than four pieces of colored paper 30 and with different colors may be used.

Referring back to FIGS. 1 and 9, spectral reflectance factors or properties and other characteristics of each different color for the object or objects 24 are previously measured and stored in step 55 in a memory in computer processing device 12, including RAM or a computer-readable medium for example.

Calculation of Tristimulus Values

Next, in step 44, computer processing device 12 converts the R, G, and B digital counts (i.e., 0–255) of display device 14 used in this example from step 41 and/or step 42 to tristimulus values based upon the characteristics of the display. For example, if the characteristics of display device 14 are described as gamma value and tristimulus values of each phosphor (e.g., red, green or blue), conversion from the RGB digital count to tristimulus values can be accomplished using the procedure described in Spec ICC.1:1998-09 "File Format For Color Profiles", which is herein incorporated by reference.

R, G, and B denote the digital counts, y denotes the gamma value of display device 14, r, g, and b denote linear R, G and B values after gamma correction, (Xr, Yr, Zr), (Xg, Yg, Zg) and (Xb, Yb, Zb) denote the tristimulus values of the each phosphor at the maximum digital count (255). (X, Y, Z) denote the tristimulus values of the display color. Thus, we have the following equation, which converts R, G, and B digital counts (i.e., 0–255) of display device 14 to tristimulus values based upon the characteristics of display device 14:

$r=(R/255)^y, g=(G/255)^y, b=(B/255)^y$, where $X=Xr \cdot r+Xg \cdot g+Xb \cdot b$, $Y=Yr \cdot r+Yg \cdot g+Yb \cdot b$, and $Z=Zr \cdot -r+Zg \cdot g+Zb \cdot b$.

The linear R, G, and B values may be stored in step 45 and the tristimulus values are stored in step 47. Next in step 49, the tristimulus values are retrieved and the spectral irradiance calculation module is activated. In step 51, the visual matching results may be shown.

Calculation of Lighting Condition

In step 59, computer processing device 12 calculates a lighting condition output from the tristimulus values which are based on the characteristics of display device 14 and the reflectance factor or factors of the object 24 and a color matching function if more than one color of the sample 20 is compared against colors of an object or objects 24.

Figure 20:
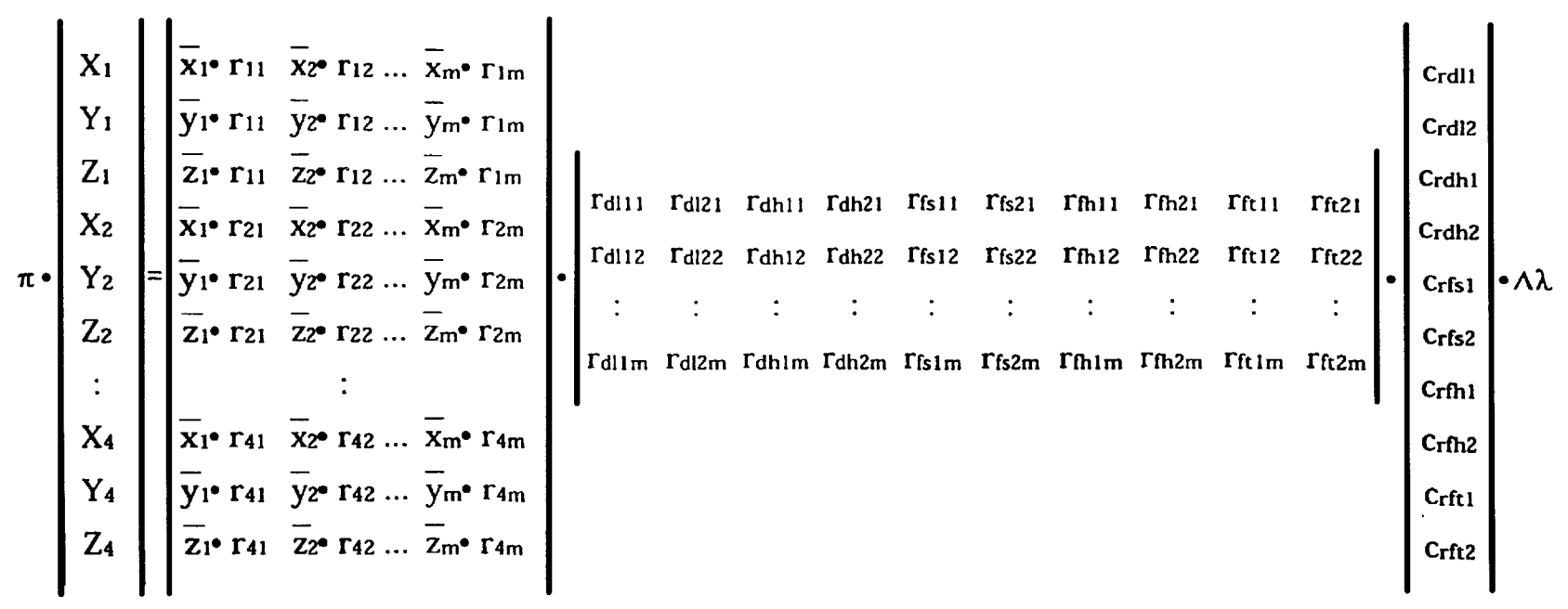

In this particular embodiment, calculation of spectral irradiance in the 'Spectral irradiance calculation module' is shown by solving the equation in FIG. 20 for ($C_{rd\,11}, \ldots, C_{rfi2}$) by the least square minimization under the constraint shown in FIG. 21 and calculating the equation shown in FIG. 22.

For example, illuminance and xy coordinates irradiating onto the surface of object 24 are calculated by the following equation, assuming spectrally non-selective colored paper 30 is used as the object 24. Specifically, Lambartian gray paper is used as the object 24, although other spectrally non-selective colors could be used. The xy coordinates refer to the xy coordinates of the light reflected from the surface assuming that this surface is a perfect diffuser. L denotes the illuminance, x and y denote the xy coordinates and Rp denotes the reflectance factor of the spectrally non-selective gray paper. The relationship between illuminance, xy coordinates and reflectance factors are well known in the art and can be found in conventional color science text books, such as "Measuring Colour Third Edition," by R. W. G. Hunt, Fountain Press, p. 15, line 4, 1998, incorporated by reference herein, and reproduced below:

$$L=\pi Y/(Rp), x=X/(X+Y+Z) \text{ and } y=Y/(X+Y+Z).$$

If several different colored papers 30 are used as reflecting objects 24 and visual matching is established for each colored paper 30, spectral irradiance onto the reflecting objects can be calculated by solving the following color matching function, where $X_i$, $Y_i$, $Z_i$ denote tristimulus values of the i-th colored paper 30 obtained by the visual matching, n denotes the total number of colored paper 30 used in the visual matching, ($1 \leq h \leq n$.) $e(\lambda 2)=(e_1, e_2, \ldots, e_m)$ denote the spectral irradiance and m denotes the number of wave length, $\Delta\lambda$ denote the intervals of wave length. For example, $e(380 \text{ nm})=e_1$, $e(385 \text{ nm})=e_2, \ldots, e(720 \text{ nm})=e_{69}$ and $\Delta\lambda,=5$ nm. $r_1(\lambda)=(r_{i1}, r_{i2}, \ldots, r_{im})$ denote the spectral reflectance factor of the i-th paper. In addition, $x(\lambda)=(x_1, \ldots, x_m)$, $y(\lambda)=(y_1, \ldots, y_m)$ and $z(\lambda)=(z_1, \ldots, z_m)$ denote the CIE 1931 color matching functions, incorporated by reference herein.

The relationship between the color matching functions, spectral irradiance and spectral reflectance factors can be found in most conventional color science text books, such as "Measuring Colour Third Edition," R. W. G. Hunt, Fountain Press, p. 15, line 4, 1998, incorporated by reference herein. In addition, this relationship expressed as an equation is shown in FIG. 10. However, the relationship described above and shown in FIG. 10 is very sensitive to noise. Noise may include different kinds of light sources, for example. Therefore, one or more constraints may be observed when solving the equation in FIG. 10 in accordance with another embodiment of the present invention.

One constraint which may be observed involves the 'Linear Combination of Basic Components'. Usually, there are a limited number of light sources in an environment, such as fluorescent lamps, incandescent lamps, and daylight, for example. Spectral power distribution of each kind of light source is described by a limited number of basic components, such as principal components, for example. For example, the spectral distribution of incandescent lamps is approximately described by two principal components, whereas the spectral distribution of fluorescent lamps is approximately described by four principal components.

Further, the spectral distribution of daylight can be approximately described by three components.

Therefore, the spectral irradiance of lighting conditions, which can be a linear combination of several light sources including fluorescent lamps, incandescent lamps and daylight, can be described by the 'Linear Combination of Basic Components' constraint described above. Further, this relationship is expressed by the equation shown in FIG. 11, where $e(\lambda)=(e_1, e_2, \ldots, e_m)$ denotes the spectral irradiance, $i_1(\lambda)=(i_{11}, i_{12}, \ldots, i_{1m})$ and $i_2(\lambda)=(i_{21}, i_{22}, \ldots, i_{2m})$ denote principal components of incandescent lamps, $f_1(\lambda)=(f_{11}, f_{12}, \ldots, f_{1m}), \ldots, f_4(\lambda)=(f_{41}, f_{42}, \ldots, f_{4m})$ denote principal components of fluorescent lamps and $d_1(\lambda)=(d_{11}, d_{12}, \ldots, d_{1m}), \ldots, d_3(\lambda)=(d_{31}, d_{32}, \ldots, d_{3m})$ denote principal components of daylight. Additionally, ($C_{i1}$, $C_{i2}$, $C_{f1}$, $C_{f2}$, $C_{f3}$, $C_{f4}$, $C_{d1}$, $C_{d2}$, $C_{d3}$) denote coefficients for the components.

By combining the equations shown in FIGS. 10 and 11, the equation shown in FIG. 12 can be obtained. Solving the equation shown in FIG. 12 for the coefficients and plugging them into the equation shown in FIG. 11, the spectral distribution can be calculated.

Another constraint which can be observed is the 'Non-negative Constraint for the Spectral Distribution.' This constraint is applied in combination with the 'Linear Combination of Basic Components' constraint described above. This constraint involves solving the equation shown in FIG. 12. Getting the solution of least a square minimization under linear constraints can be easily performed by utilizing a mathematical programming package well known to those of ordinary skill in the art, such as MATLAB which is herein incorporated by reference. This constraint can remove the negative spectral distributions that are physically unreasonable.

Yet another constraint which can be observed is a, 'Use of Non-negative Rotated Components and Non-negative Constraint for Each Coefficient.' This constraint is based on the assumption that each light source group (e.g., incandescent lamp, fluorescent lamp or daylight) is described by a non-negative linear combination of non-negative components. This assumption is usually correct. Each non-negative component is regarded as an imaginary principal light source because it has only non-negative values, as does a real light source. In this example, the non-negative components are calculated by rotation as shown in FIG. 14 and the coefficients for rotation are determined by an optimization process that maximizes the equation in FIG. 15 under FIG. 16. If the number of principal components for describing the spectral radiance is two, the coefficients for rotation can be usually determined by solving the equations in FIGS. 17 and 18.

$P_i(\lambda)=(P_{i1}, P_{i2}, \ldots, P_{im})$ denotes spectral radiance of the i-th light source in each kind of light source. N denotes the number of light sources that belong to each kind of light source where ($h \leq i \leq N$.) For example, $P_1(\lambda)=F_1(\lambda), \ldots, P_{12}(\lambda)=F_{12}(\lambda)$. ($F \cdot (\lambda)$ denotes spectral distributions of the representative fluorescent lamps as specified by the CIE (Commission Internationale de l'Éclairage), incorporated by reference herein. $P_j(\lambda)=(P_{j1}, P_{j2}, \ldots, p_{jm})$ denote principal components of $p_1(\lambda), \ldots, P_N(\lambda)$. k denotes the number of principal components of each kind of light source. ($1 \leq j < k$.) pinv0 denotes the pseudo inverse matrix and min0 denotes the minimum coefficient. Minforeach0 and maxforeach0 denote a minimum value for each i and a maximum value for each i, respectively. Calculation of the pseudo inverse matrix can again be performed easily by utilizing a mathematical programming package, such as MATLAB.

After determining the rotated principal components, the principal components shown in FIG. 13 are replaced by the rotated principal components. This equation is solved under the equation shown in FIG. 19.

Another constraint that can be observed is the, 'Use of Spectral Distribution of Actual Light Sources as Basic Components and Non-negative Constraints for Each Coefficient.' After the principal components in FIG. 12 are replaced with the spectral distributions of actual light sources, the equation is solved under the non-negative constraint shown in FIG. 19.

The above-described constraint is similar to the 'Non-negative Constraint for the Spectral Distribution' constraint, where the lighting condition measurement is expressed as a non-negative linear combination of the spectral distribution of actual light sources. In addition, the former constraint is similar to the 'Use of Non-negative Rotated Components and Non-negative Constraint for Each Coefficient' constraint, except that the rotation procedure is not needed because the spectral distribution of actual light sources are used as basic components instead of the rotated principal components. However, the procedure for solving the former constraint is relatively cumbersome because the number of components is larger than the latter constraint. In this particular embodiment, two different types of daylight (above 7000K or below 7000K) and three different kinds of fluorescent lamps (standard type, high color rendering type or triband type) are assumed to be the possible light sources although other types and numbers of light sources are also possible.

Also in this particular embodiment, the 'Use of Non-negative Rotated Components and Non-negative Constraint for each Coefficient' constraint is used for determining spectral irradiance. The non-negative components for each kind of light source are calculated by rotation as shown in FIG. 14 and the coefficients for rotation are determined by an optimization process that maximizes the equation in FIG. 15 under the equation in FIG. 16, and stored in computer processing device 12 in a memory, which can include a computer-readable medium, RAM or a database.

Figures 29, 30, 31:
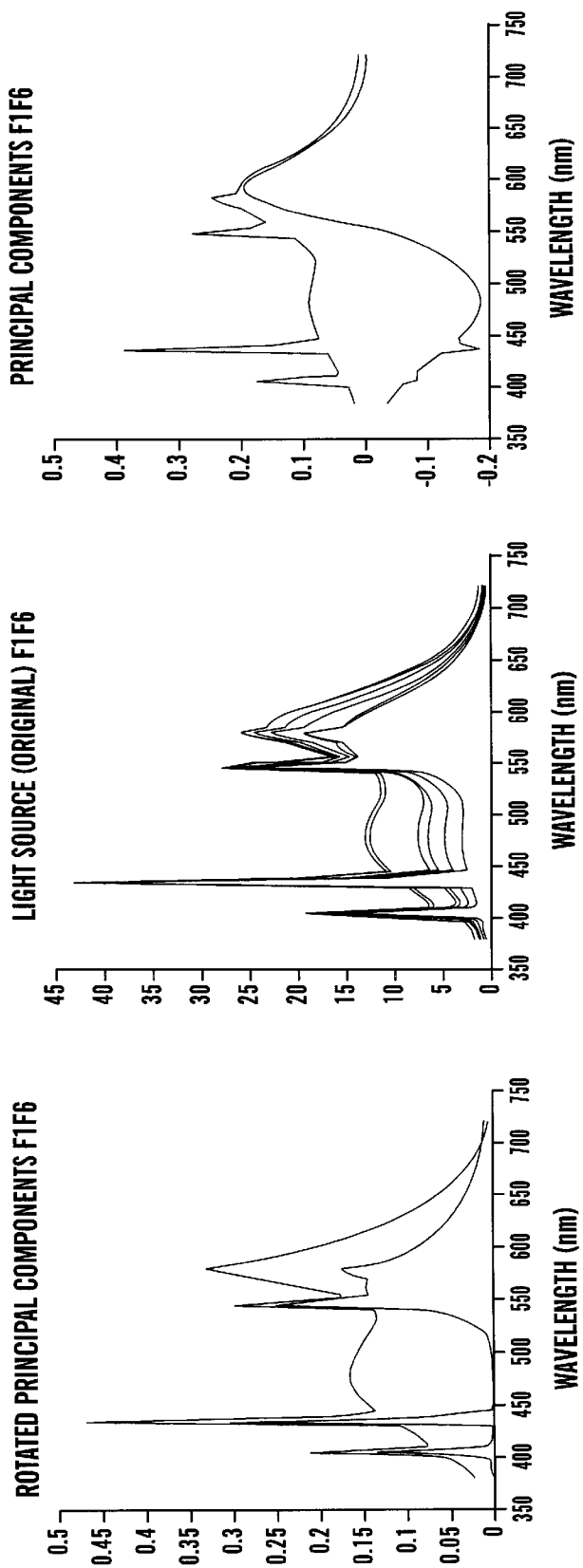
FIGS. 29–31 ar graphs of rotated components, spectral distributions of light sources and their principal components for standard type fluorescent lamps.
Figure 32:
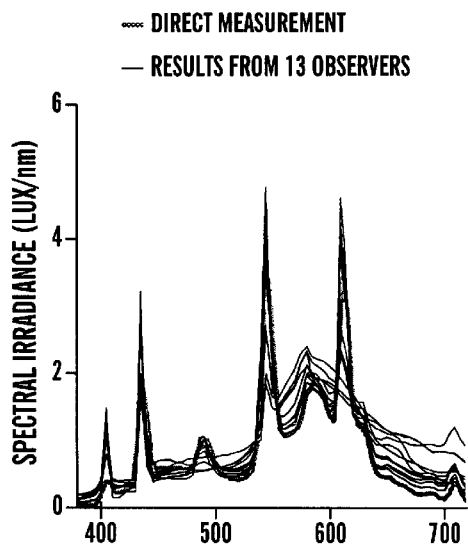
FIGS. 32–38 are graphs showing comparisons between the spectral irradiance outputs determined in accordance with one embodiment of the present invention and the spectral irradiance outputs obtained through direct measurement.
Figure 33:
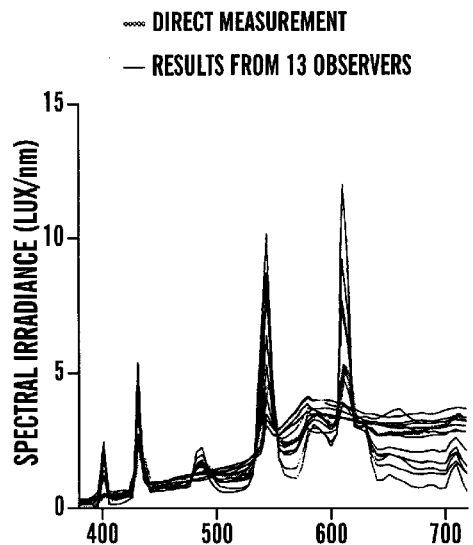
Figure 34:
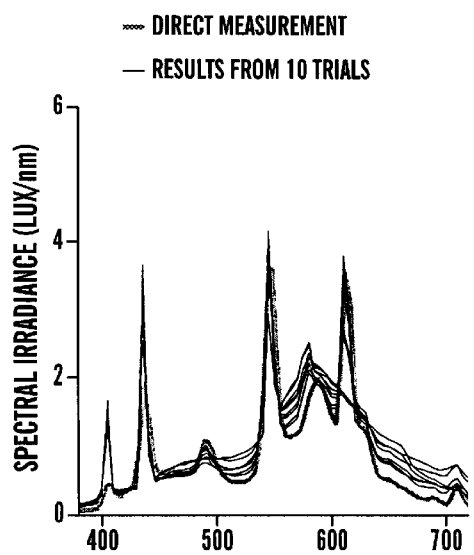
Figure 35:
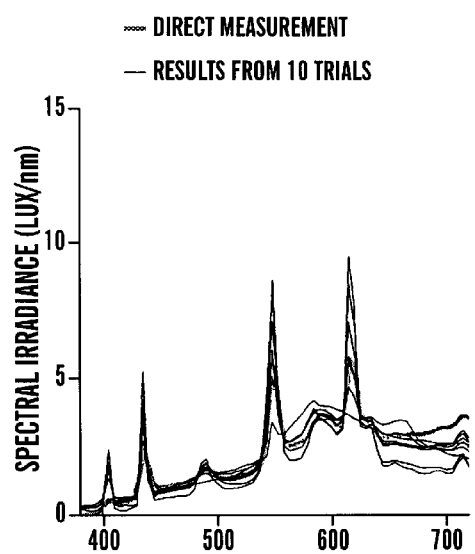
Figure 36:
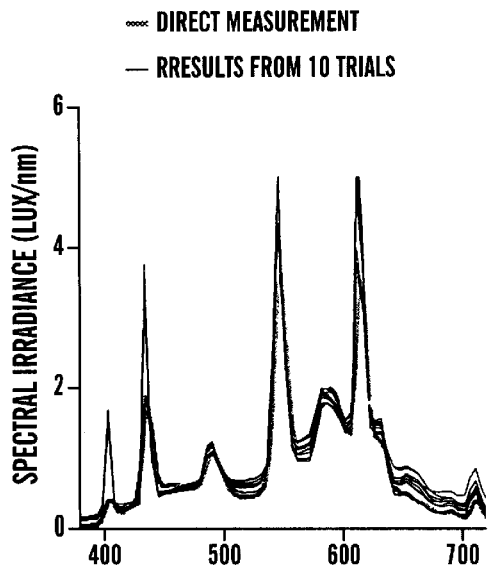
Figure 37:
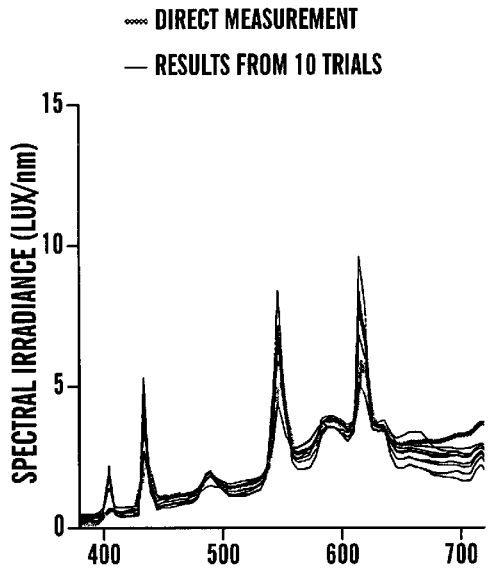
Figure 38:
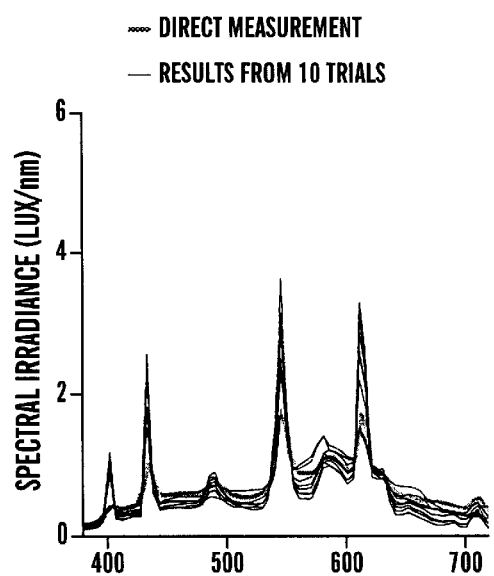
Figure 39:
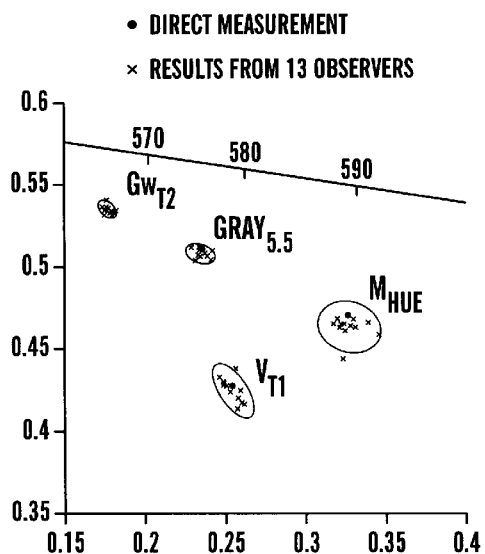
FIGS. 39–42 are graphs showing comparisons between the visual matching results of one embodiment of the present invention and direct measurement, as expressed by chromaticity coordinates and luminance values.

As $P_1(\lambda)=P_{i1}, P_{i2}, \ldots, P_{im})$ and $p_i(\lambda)=(p_{i1}, P_{i2}, \ldots, p_{im})$, the following spectral distributions are used for each kind of light source and the following non-negative components $r_j(\lambda)=(r_{j1}, r_{j2}, \ldots, r_{jm})$ are calculated. The calculation results as described below ($r_{d11}(k)$, $r_{d12}(\lambda)$, $r_{dh1}(\lambda)$, $r_{dh2}(\lambda)$, $r_{fs1}(\lambda)$, $r_{fs2}(\lambda)$, $r_{fh1}(\lambda)$, $r_{fh2}(\lambda)$, $r_{ft1}(\lambda)$, $r_{ft2}(\lambda)$) are stored in computer processing device 12 in a memory, which can include a computer-readable medium, RAM or a database. In addition, examples of rotated components, the spectral distributions of light sources and their principal components are shown in FIGS. 29, 30 and 31 for standard type fluorescent lamps.

1. Below 7000K Daylight (Low Temperature)
    Spectral distributions used for the calculation
        $P_1(\lambda)$: spectral radiance of 3000K CIE daylight
        $P_2(\lambda)$: spectral radiance of 4000K CIE daylight
        $P_3(\lambda)$: spectral radiance of 5000K CIE daylight
        $P_4(\lambda)$: spectral radiance of 6000K CIE daylight
        $P_5(\lambda)$: spectral radiance of 7000K CIE daylight
        $p_1(\lambda)$: first principal component of $P_1(\lambda)\sim P_5(\lambda)$
        $p_2(\lambda)$: second principal component of $P_1(\lambda)\sim P_5(\lambda)$
    Calculation results (correspond to $r_j(\lambda)=(r_{j1}, r_{j2}, \ldots, r_{jm})$)
        $r_{d11}(\lambda)$: first rotated component
        $r_{d12}(\lambda)$: second rotated component
2. Above 7000K Daylight (High Temperature)
    Spectral distributions used for the calculation
        $P_1(\lambda)$: spectral radiance of 7000K CIE daylight
        $P_2(\lambda)$: spectral radiance of 8000K CIE daylight
        $P_3(\lambda)$: spectral radiance of 10000K CIE daylight
        $P_4(\lambda)$: spectral radiance of 14000K CIE daylight
        $P_5(\lambda)$: spectral radiance of 20000K CIE daylight
        $p_1(\lambda)$: first principal component of $P_1(\lambda)\sim P_5(\lambda)$
        $p_2(\lambda)$: second principal component of $P_1(\lambda)\sim P_5(\lambda)$
    Calculation results (correspond to $r_j(\lambda)=(r_{j1}, r_{j2}, \ldots, r_{jm})$)
        $r_{dh1}(\lambda)$: first rotated component
        $r_{dh2}(\lambda)$: second rotated component
3. Standard Type Fluorescent Lamp
    Spectral distributions used for the calculation
        $P_1(\lambda)$: spectral radiance of CIE F1 representative fluorescent lamp
        $P_2(\lambda)$: spectral radiance of CIE F2 representative fluorescent lamp
        $P_3(\lambda)$: spectral radiance of CIE F3 representative fluorescent lamp
        $P_4(\lambda)$: spectral radiance of CIE F4 representative fluorescent lamp
        $P_5(\lambda)$: spectral radiance of CIE F5 representative fluorescent lamp
        $P_6(\lambda)$: spectral radiance of CIE F6 representative fluorescent lamp
        $p_1(\lambda)$: first principal component of $P_1(\lambda)\sim P_6(\lambda)$
        $p_2(\lambda)$: second principal component of $P_1(\lambda)\sim P_6(\lambda)$
    Calculation results (correspond to $r_j(\lambda)=(r_{j1}, r_{j2}, \ldots, r_{jm})$)
        $r_{fs1}(\lambda)$: first rotated component
        $r_{fs2}(\lambda)$: second rotated component
4. High Color Rendering Type Fluorescent Lamp
    Spectral distributions used for the calculation
        $P_1(\lambda)$: spectral radiance of CIE F7 representative fluorescent lamp
        $P_2(\lambda)$: spectral radiance of CIE F8 representative fluorescent lamp
        $P_3(\lambda)$: spectral radiance of CIE F9 representative fluorescent lamp
        $p_1(\lambda)$: first principal component of $P_1(\lambda)\sim P_3(\lambda)$
        $p_2(\lambda)$: second principal component of $P_1(\lambda)\sim P_3(\lambda)$
    Calculation results (correspond to $r_j(\lambda)=(r_{j1}, r_{j2}, \ldots, r_{jm})$)
        $r_{fh1}(\lambda)$: first rotated component
        $r_{fh2}(\lambda)$: second rotated component
5. Triband Type Fluorescent Lamp
    Spectral distributions used for the calculation
        $P_1(\lambda)$: spectral radiance of CIE F10 representative fluorescent lamp
        $P_2(\lambda)$: spectral radiance of CIE F11 representative fluorescent lamp
        $P_3(\lambda)$: spectral radiance of CIE F12 representative fluorescent lamp
        $P_4(\lambda)$: spectral radiance of CIE F4 representative fluorescent lamp
        $P_5(\lambda)$: spectral radiance of CIE F5 representative fluorescent lamp
        $P_6(\lambda)$: spectral radiance of CIE F6 representative fluorescent lamp
        $p_1(\lambda)$: first principal component of $P_1(\lambda)\sim P_3(\lambda)$
        $p_2(\lambda)$: second principal component of $P_1(\lambda)\sim P_3(\lambda)$
    Calculation results (correspond to $r_j(\lambda)=(r_{j1}, r_{j2}, \ldots, r_{jm})$)
        $r_{ft1}(\lambda)$ first rotated component
        $r_{ft2}(\lambda)$: second rotated component Constraints as to the kind of light sources to be used may also be applied. One of these constraints relates to the kind of daylight. In this embodiment an assumption is made that there are two different kinds of daylight, although usually only one kind of daylight exists. A mixture of two different kinds of daylight is not physically plausible under normal conditions. However, spectral irradiance with either daylight component may be physically plausible. Thus, by calculating two spectral irradiance values with either low or high temperature daylight (i.e., calculating spectral irradiance without high temperature daylight or calculating spectral irradiance without low temperature daylight) and selecting the better result, a physically plausible spectral irradiance value can be obtained. These calculation and selection procedures are shown by the following equations.

FIG. 23 shows the equation without high temperature daylight and FIG. 24 shows the constraint for solving the equation in FIG. 23. FIG. 25 shows the equation without low temperature daylight and the equation in FIG. 26 is the constraint for solving FIG. 15. If the square error of FIG. 23 is less than the square error of FIG. 25, then the solutions to the equation in FIG. 23 ($C_{rd11}$, ..., $C_{rft2}$) are selected and converted to the spectral irradiance values using the equation in FIG. 27. Otherwise, the solutions to the equation in FIG. 25 ($C_{rd11}$, ..., $C_{rft2}$) are selected and converted to the spectral irradiance values using the equation in FIG. 28.

Another constraint is the kind of light source specified by a user. In some cases, a user can specify the kind of light source used as a constraint. For example, if there is no window in the user's environment, daylight components should not exist in the lighting condition. Thus, by adding an option for specifying the kind of light source used as a constraint before calculating the lighting conditions for the user and removing unneeded components, better results can be obtained.

Figure 40:
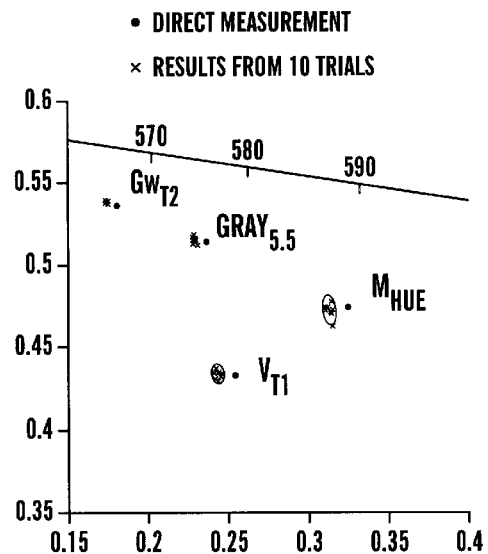
Figure 41:
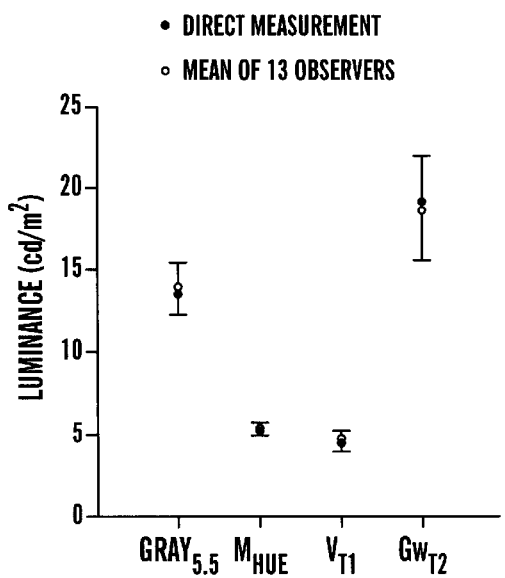
Figure 42:
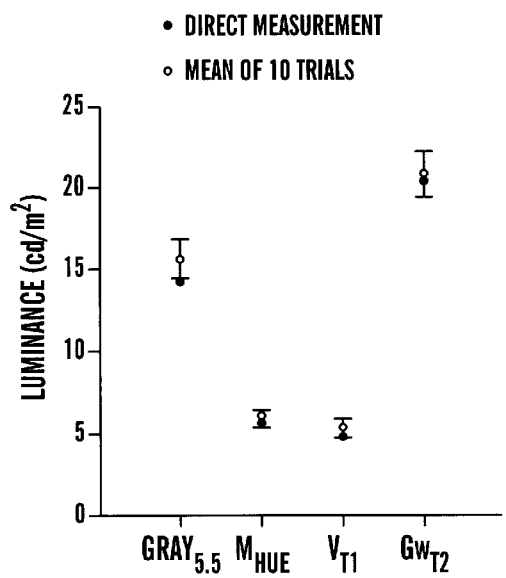

Referring to FIGS. 39–42, examples of chromaticity coordinates and the luminance value of visual matching results are shown. Chromaticity coordinates and the luminance of light reflected off each sheet of colored paper obtained by direct measurement are also shown as reference points. Ellipses shown in FIGS. 39 and 40 indicate 95% confidence regions calculated from the covariance matrix, which corresponds to 2.448 times the standard deviation. FIGS. 41 and 42 also show 95% confidence regions.

Referring to FIG. 40, significant differences between chromaticity coordinates of visual matching results from the observer who tried ten trials and that of direct measurement are shown. The differences are significant despite the relatively small deviations of chromaticity coordinates. Conversely, the mean chromaticity coordinates are not significantly different between results from the thirteen observers and direct measurement.

For each experiment, direct measurement of the spectral irradiance was conducted using a PR-650 and PTFE in accordance with the teachings found in "Goniospectrophotometric analysis of pressed PTFE powder for use as a primary transfer standard," Appl. Opt., 27, 3392–3396, 1988, herein incorporated by reference. The results of the direct measurements were compared against the spectral irradiance values determined in accordance with one embodiment of the present invention.

Referring to FIGS. 32–38, a comparison between the spectral irradiance obtained by the present invention and direct measurement are shown. According to FIGS. 32–38, a reasonable spectral irradiance can be determined from the visual matching results in accordance with one embodiment of the present invention. Numerical evaluations of performance were taken are from two points of view and are discussed below.

First, illuminance and u'v' coordinates were examined. Referring to FIG. 41, mean differences and standard deviations for each component are shown. The error amounts do not depend significantly on the error of the visual matching results. For example, in FIGS. 39 and 41, mean visual matching errors of v' coordinates are −0.03 to −0.08, but the mean error of the v' coordinate in the measurements is +0.04. The calculation procedure is designed to obtain reasonable spectral distribution from limited subspaces constructed by non-negative linear combinations of the rotated principal components.

Second, the performance of the present invention was evaluated to determine spectral irradiance value(s) used for spectral-based color management systems in which calculations of object color are necessary. The evaluations were based on color differences between object color calculated with the spectral irradiance value obtained by the present invention and object color calculated with the spectral irradiance value obtained by direct measurement. One of the advantages of the present invention is that spectral irradiance values determined by the present invention are accurate enough to be used by spectral-based color management systems as illustrated in the examples above.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for measuring a lighting condition of an object having one or more colors, the method comprising:

providing one or more samples, each of the samples having one or more colors;

comparing one of the colors of the object against one of the colors of one of the samples, the color of the sample being compared defined by a plurality of color attribute values;

adjusting at least one of the plurality of color attribute values representing the color of the sample being compared until the color of the sample appears to substantially match the color of the object; and determining a lighting condition value of the object over a first range based on the at least one adjusted color attribute value.

2. The method of claim 1 wherein the lighting condition is also determined based on a reflectance factor of the object.

3. The method of claim 1 wherein the lighting condition value is a spectral irradiance value.

4. The method of claim 1 wherein the color of the object and the color of the sample have different dependencies on the lighting condition.

5. The method of claim 4 wherein one of the colors of the object or the sample is the color of a reflective material and the other color is the color of a self emitting device.

6. The method of claim 1 further comprising converting the adjusted color attribute values into corresponding tristimulus values based upon at least one characteristic of a display device having the sample displayed thereon, wherein the lighting condition is determined based upon the corresponding tristimulus values.

7. The method of claim 6 wherein the at least one characteristic includes a gamma value and a tristimulus value of each of a red, green and blue phosphor.

8. The method of claim 1 further comprising:
providing a color matching function;
wherein the comparing and the adjusting are performed once for two or more of the colors of the object against different colors of the one or more samples; and
wherein the lighting condition is determined based upon the color matching function and the adjusted color attribute values for the different colors of the one or more samples compared and adjusted against the two or more colors of the object.

9. The method of claim 8 wherein the two or more colors of the object comprise gray, magenta, violet and green.

10. The method of claim 1 wherein the determining further comprises:
determining multiple lighting condition values;
determining an error value for each one of a plurality of linear relationships corresponding to each of the lighting condition values; and
selecting the lighting condition value that represents a lowest error value.

11. The method of claim 1 wherein the determining further comprises adhering to at least one of a plurality of constraints in the determining of the lighting condition value of the object.

12. The method of claim 11 wherein one of the constraints is derived from a characteristic of a light source which irradiates the object.

13. The method of claim 12 wherein the light source comprises daylight, fluorescent light or incandescent light.

14. The method of claim 12 wherein the characteristic is a spectral power distribution of the light source.

15. The method of claim 11 wherein one of the constraints specifies that the lighting condition value be non-negative.

16. The method of claim 1 further comprising displaying the lighting condition value on a computer monitor to indicate the measurement.

17. The method of claim 1 further comprising using the lighting condition value to adjust color levels of one or more documents printed by a printing device.

18. The method of claim 1 further comprising using the lighting condition value to adjust color levels of one or more images displayed on a display device.

19. The method of claim 1 further comprising using the lighting condition value to adjust color levels of one or more images stored in a memory.

20. The method of claim 1 further comprising reducing the amount of irradiated light reflected onto the sample being compared.

21. The method of claim 20 wherein the reducing comprises at least partially covering the sample being compared with a device having at least a partial opening for viewing the sample compared.

22. The method of claim 1 wherein the comparing comprises displaying a color patch as the sample and displaying the object using a characterized display device, and then comparing one of the colors of the object against one of the colors of the color patch.

23. The method of claim 1 wherein the comparing further comprises using at least one piece of colored material as the object.

24. The method of claim 1 wherein at least one of the plurality of color attribute values comprise R, G, and B digital count values.

25. The method of claim 1 wherein the first range is over a visible light spectrum.

26. The method of claim 25 wherein the visible light spectrum is from 380 nm to 720 nm.

27. An apparatus for measuring a lighting condition of an object having one or more colors, the apparatus comprising:
a display device which displays one or more samples for comparing one of the colors of the object against one of one or more colors of one of the samples;
a color attribute interface for adjusting at least one of a plurality of color attribute values representing the color of the sample until the color of the sample appears to substantially match the color of the object; and
a processing system for determining a lighting condition value of the object based on the at least one adjusted color attribute value.

28. The apparatus of claim 27 wherein the color of the sample has a reflectance property and the lighting condition value is also determined based on the reflectance property.

29. The apparatus of claim 27 wherein the lighting condition value is a spectral irradiance value.

30. The apparatus of claim 27 wherein the processing system converts the adjusted color attribute values into corresponding tristimulus values based upon at least one characteristic of the display device wherein the lighting condition is determined based upon the corresponding tristimulus values and the reflectance property of the sample.

31. The apparatus of claim 30, wherein the at least one characteristic includes a gamma value and tristimulus values of red, green and blue.

32. The apparatus of claim 27 further comprising:
providing a color matching function;
wherein the comparing and the adjusting are performed once for two or more of the colors of the object against different colors of the one or more samples; and
wherein the lighting condition is determined based upon the color matching function and the adjusted color attribute values for the different colors of the one or more samples compared and adjusted against the two or more colors of the object.

33. The apparatus of claim 32 wherein the two or more colors of the object comprise gray, magenta, violet and green.

34. The apparatus of claim 27 wherein the determining further comprises:
determining multiple lighting condition values;
determining an error value for each one of a plurality of linear relationships corresponding to each of the lighting condition values; and
selecting the lighting condition value that represents a lowest error value.

35. The apparatus of claim 27 wherein the determining further comprises adhering to at least one of a plurality of constraints in the determining the lighting condition value of the object.

36. The apparatus of claim 35 wherein one of the constraints is derived from a characteristic of a light source which irradiates the object.

37. The apparatus of claim 36 wherein the light source comprises daylight, fluorescent light or incandescent light.

38. The apparatus of claim 36 wherein the characteristic is a spectral power distribution of the light source.

39. The apparatus of claim 35 wherein one of the constraints specifies that the lighting condition value be non-negative.

40. The apparatus of claim 27 further comprising displaying the lighting condition value on a computer monitor to indicate the measurement.

41. The apparatus of claim 27 further comprising using the lighting condition value to adjust color levels of one or more documents printed by a printing device.

42. The apparatus of claim 27 further comprising using the lighting condition value to adjust color levels of one or more images displayed on a display device.

43. The apparatus of claim 27 further comprising using the lighting condition value to adjust color levels of one or more images stored in a memory.

44. The apparatus of claim 27 further comprising a shield device reducing the amount of irradiated light reflected onto the sample being compared.

45. The apparatus of claim 27 wherein the comparing comprises displaying a color patch as the sample and displaying the object using a characterized display device, and then comparing one of the colors of the object against one of the colors of the color patch.

46. The apparatus of claim 27 wherein the plurality of color attribute values comprise R, G, and B digital count values.

47. A program storage device readable by a machine tangibly embodying a program of instructions executable by the machine to perform a method for determining a lighting condition of an object having one or more colors comprising:

providing one or more samples, each of the samples having one or more colors;

comparing one of the colors of the object against one of the colors of one of the samples, the color of the sample being compared defined by a plurality of color attribute values;

adjusting at least one of the plurality of color attribute values representing the color of the sample being compared until the color of the sample appears to substantially match the color of the object; and determining a lighting condition value of the object based on the at least one adjusted color attribute value.

48. The device of claim 47 wherein the color of the sample has a reflectance property and the lighting condition value is also determined based on the reflectance property of the color of the sample being compared.

49. The device of claim 47 wherein the lighting condition value is a spectral irradiance value.

50. The device of claim 47 further comprising converting the adjusted color attribute values into corresponding tristimulus values based upon at least one characteristic of a display device having the sample displayed thereon, wherein the lighting condition is determined based upon the corresponding tristimulus values.

51. The device of claim 47 wherein the at least one characteristic includes a gamma value and a tristimulus value of each of a red, green and blue phosphor.

52. The device of claim 47 further comprising:

providing a color matching function;

wherein the comparing and the adjusting are performed once for two or more of the colors of the object against different colors of the one or more samples; and wherein the lighting condition is determined based upon the color matching function and the adjusted color attribute values for the different colors of the one or more samples compared and adjusted against the two or more colors of the object.

53. The device of claim 47 wherein the determining further comprises:

determining multiple lighting condition values;

determining an error value for each one of a plurality of linear relationships corresponding to each of the lighting condition values; and selecting the lighting condition value that represents a lowest error value.

54. The device of claim 47 wherein the two or more colors of the object comprise gray, magenta, violet and green.

55. The device of claim 47 wherein the determining further comprises adhering to at least one of a plurality of constraints in the determining of the lighting condition value of the object.

56. The device of claim 55 wherein one of the constraints is derived from a characteristic of a light source which irradiates the object.

57. The device of claim 56 wherein the light source comprises daylight, fluorescent light or incandescent light.

58. The device of claim 56 wherein the characteristic is a spectral power distribution of the light source.

59. The device of claim 55 wherein one of the constraints specifies that the lighting condition value be non-negative.

60. The device of claim 47 further comprising displaying the lighting condition value on a computer monitor to indicate the measurement.

61. The device of claim 47 further comprising using the lighting condition value to adjust color levels of one or more documents printed by a printing device.

62. The device of claim 47 further comprising using the lighting condition value to adjust color levels of one or more images displayed on a display device.

63. The device of claim 47 further comprising using the lighting condition value to adjust color levels of one or more images stored in a memory.

64. The device of claim 47 further comprising reducing the amount of irradiated light reflected onto the sample being compared.

65. The device of claim 64 wherein the reducing comprises at least partially covering the sample being compared with a device having at least a partial opening for viewing the sample compared.

66. The device of claim 47 wherein the comparing comprises displaying a color patch as the sample and displaying the object using a characterized display device, and then comparing one of the colors of the object against one of the colors of the color patch.

67. The device of claim 47 wherein the comparing further comprises using at least one piece of colored material as the object.

68. The device of claim 47 wherein at least one of the plurality of color attribute values comprise R, G, and B digital count values.

* * * * *